(12) United States Patent
Abraham et al.

(10) Patent No.: US 9,648,485 B2
(45) Date of Patent: May 9, 2017

(54) DISCOVERY OF A NEIGHBOR AWARENESS NETWORK (NAN) USING A WAKE UP MESSAGE

(71) Applicant: QUALCOMM Incorporated, San Diego, CA (US)

(72) Inventors: Santosh Paul Abraham, San Diego, CA (US); Alireza Raissinia, Monte Sereno, CA (US); Stephen Jay Shellhammer, Ramona, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 14/611,932

(22) Filed: Feb. 2, 2015

(65) Prior Publication Data
US 2015/0223047 A1    Aug. 6, 2015

Related U.S. Application Data

(60) Provisional application No. 61/935,189, filed on Feb. 3, 2014.

(51) Int. Cl.
*H04W 8/00* (2009.01)
*H04W 48/16* (2009.01)
*H04W 52/02* (2009.01)
*H04W 88/06* (2009.01)

(52) U.S. Cl.
CPC ........... *H04W 8/005* (2013.01); *H04W 48/16* (2013.01); *H04W 52/0216* (2013.01); *H04W 52/0229* (2013.01); *H04W 52/0209* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2009/0221261 A1 | 9/2009 | Soliman | |
| 2013/0346207 A1 | 12/2013 | Qi et al. | |
| 2015/0200811 A1* | 7/2015 | Kasslin | ................... H04L 41/12 370/254 |

FOREIGN PATENT DOCUMENTS

| | | | | |
|---|---|---|---|---|
| EP | 2273828 B1 | | 1/2012 | |
| SE | WO 2009/022201 | * | 2/2009 | ............... H04Q 7/32 |
| WO | 2009022201 A1 | | 2/2009 | |

OTHER PUBLICATIONS

International Search Report and Written Opinion—PCT/US2015/014291—ISA/EPO—Apr. 22, 2015, 16 pages.
Qin H. et al., "ZigBee-Assisted Power Saving Management for Mobile Devices", Proceedings of the 2012 IEEE 9th International Conference on Mobile Ad-Hoc and Sendor Systems (MASS), IEEE, Oct. 8, 2012, pp. 93-101.

* cited by examiner

*Primary Examiner* — Fan Ng
(74) *Attorney, Agent, or Firm* — Toler Law Group, PC

(57) ABSTRACT

A method includes transmitting, from an electronic device in a neighbor awareness network (NAN) via a first wireless protocol, a wake up message indicating discovery information associated with a second wireless protocol. The method further includes communicating information via the NAN using the second wireless protocol after transmitting the wake up message.

29 Claims, 11 Drawing Sheets

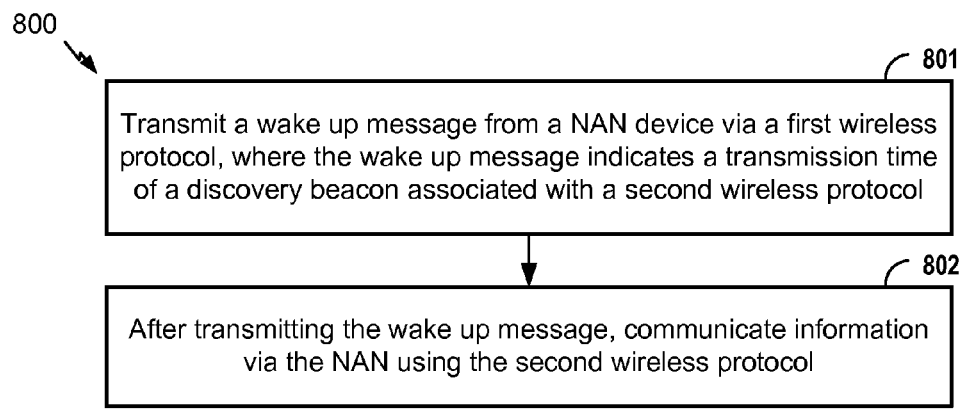
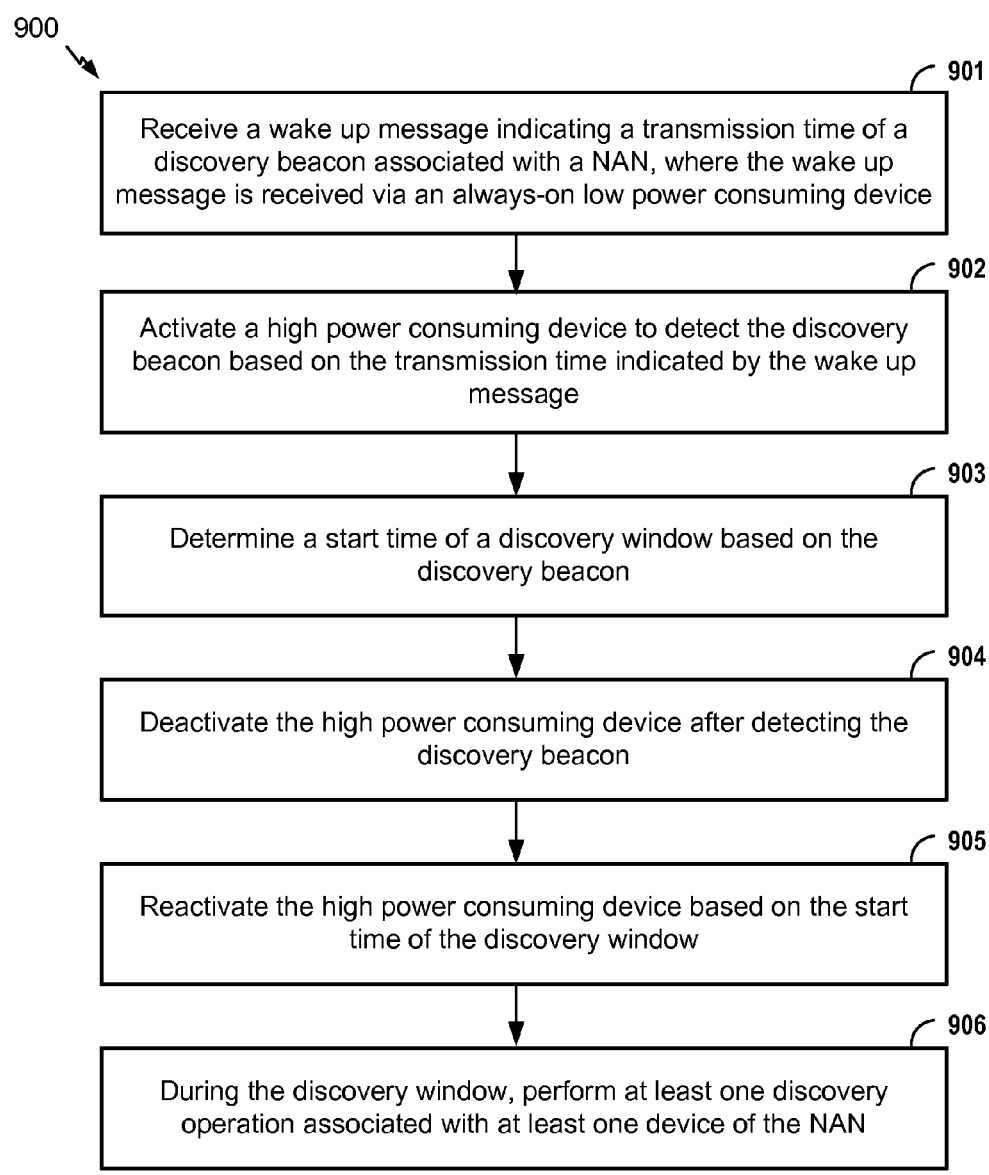

ND NEIGHBOR AWARENESS
NETWORK (NAN) USING A WAKE UP
MESSAGE

I. CLAIM OF PRIORITY

This application claims priority from U.S. Provisional Patent Application No. 61/935,189, filed Feb. 3, 2014 and entitled "METHOD AND APPARATUS FOR LOW POWER NEIGHBOR AWARENESS NETWORKING (NAN) DISCOVERY," the contents of which are incorporated herein in their entirety.

II. FIELD

The present disclosure is generally related to discovery of neighbor awareness networks (NANs).

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data. Electronic devices may also use wireless connections to exchange information directly with each other. For example, mobile electronic devices that are in close proximity to each may exchange data (e.g., images, data files, video, and other information) with each other. This data exchange between mobile electronic devices may include transferring the data via a communication path involving the devices' wireless service providers (e.g., particular entities providing cellular network services), Wi-Fi access points, and the Internet. Establishing such data connections between the mobile electronic devices can consume time and results in power consumption by the mobile electronic devices.

IV. SUMMARY

The use of a neighbor awareness network (NAN) may enable mobile electronic devices in close proximity to perform data exchanges via the NAN (e.g., essentially without involving wireless carriers, Wi-Fi access points, or the Internet). The exchange of information between mobile electronic devices in a NAN can occur through use of a wireless network that employs Institute of Electrical and Electronics Engineers (IEEE) 802.11 protocols. For example, a NAN utilizing certain IEEE 802.11 protocols (e.g., 802.11a, 802.11b, 802.11g, 802.11n, 802.11ac, 802.11ad, etc.) may support data transfer via a 2.4 gigahertz (GHz) or 5 GHz frequency band. When a mobile device enters the coverage area of a NAN, the mobile device may activate a 2.4/5 GHz receiver (or transceiver) to determine whether a NAN is available. A NAN protocol may provide for the periodic broadcast of a "discovery beacon" that notifies newly arriving mobile devices when the next NAN "discovery window" (alternately referred to as a detection window) will occur. During the discovery window, devices may identify other devices in the NAN, identify services provided by devices in the NAN, transfer data to other devices in the NAN, or schedule a future data transfer (e.g., a data transfer after the conclusion of the discovery window). Discovery beacons may be transmitted approximately 100 milliseconds (ms) to 200 ms apart. Thus, a mobile device may activate a 2.4 GHz or a 5 GHz receiver (or transceiver) for at least 200 ms to listen for a discovery beacon and identify whether a NAN is available. However, the 2.4 GHz or the 5 GHz receiver (or transceiver) may have components that consume a significant amount of power while in operation. As such, operating the 2.4 GHz or the 5 GHz receiver (or transceiver) for a long period of time may result in consuming an unacceptably high amount of power, and significantly reducing battery life at the mobile device.

Methods and apparatuses are disclosed that enable a device to discover and access a NAN while reducing power consumption of the device. Wireless devices may operate based on the examples described herein to reduce power consumption associated with determining when a next NAN discovery window will occur. For example, a mobile device may include a high power consuming device (such as a 5 GHz receiver or transceiver) and a low power consuming device (such as a sub-1 GHz receiver or transceiver). The mobile device may operate using the low power consuming device until the mobile device receives a wake up message. The wake up message may prompt the mobile device to activate the high power consuming device to communicate using the NAN, such as by indicating discovery information related to the NAN.

For example, the wake up message may be transmitted from an electronic device associated with the NAN a short time before the discovery beacon is to be broadcast (by the electronic device or by another device associated with the NAN). The electronic device may transmit the wake up message at a particular time offset from the time to broadcast the discovery beacon. The mobile device may activate the higher power consuming device a short time prior to broadcast of the discovery beacon to receive the discovery beacon.

As another example, the wake up message may be transmitted from an electronic device associated with the NAN a short time before a discovery window associated with the NAN. In this example, the mobile device may activate the high power consuming device shortly before the discovery window. During the discovery window, the mobile device may use the high power consuming device to identify other devices in the NAN, to identify one or more services provided by devices in the NAN, to transfer data to other devices in the NAN, or to schedule a future data transfer (e.g., a data transfer after the conclusion of the discovery window), as illustrative examples. In some networks, discovery beacons may be broadcast at times between discovery windows by devices associated with the NAN. In other networks, devices associated with the NAN may avoid broadcasting discovery beacons (e.g., to reduce power consumption by devices of the NAN).

By receiving the wake up message a short time duration before the discovery beacon is to be broadcast or before the discovery window, power consumption of the mobile device may be reduced. For example, by using the low power consuming device to receive the wake up message, the mobile device may reduce an amount of time that the high power consuming device is active. Operation of the low power consuming device results in less power consumption at the mobile device as compared to use of the high power consuming device, which may significantly increase battery life of the mobile device.

In another example, the mobile device may utilize an active scanning technique to detect the NAN. To illustrate, instead of waiting for a wake up message (e.g., using a passive scanning technique), the mobile device may transmit a probe request using the low power consuming device. The probe request may be received by one or more devices associated with the NAN. The probe request may request an indication of when the next discovery window will occur. An electronic device associated with the NAN may respond by transmitting a probe response that indicates when the next discovery window will occur. The mobile device may receive the probe response using the low power consuming device and may activate the high power consuming device to communicate during the discovery window, resulting in lower power consumption at the mobile device as compared to scanning using the high power consuming device.

In a particular example, a method of communication includes transmitting, from an electronic device in a neighbor awareness network (NAN) via a first wireless protocol, a wake up message indicating discovery information associated with a second wireless protocol. The discovery information may indicate a transmission time of a discovery beacon of the second wireless protocol, a discovery window associated with the second wireless protocol, or a time indication of the discovery window of the second wireless protocol, as illustrative examples. The method further includes communicating information via the NAN using the second wireless protocol after transmitting the wake up message.

In another example, an apparatus for communication includes a processor and a memory storing instructions. The instructions are executable by the processor to cause the processor to initiate transmission, via a neighbor awareness network (NAN) and using a first wireless protocol, of a wake up message indicating discovery information of the NAN. The NAN operates in accordance with a second wireless protocol. The instructions are executable by the processor to further cause the processor to communicate information via the NAN using the second wireless protocol after transmission of the wake up message.

In another example, a non-transitory processor readable medium includes instructions. The instructions are executable by the processor to cause the processor to initiate transmission, from an electronic device in a neighbor awareness network (NAN) via a first wireless protocol, of a wake up message indicating discovery information of the NAN. The NAN operates in accordance with a second wireless protocol. The instructions are executable by the processor to further cause the processor to communicate information via the NAN using the second wireless protocol after transmission of the wake up message.

In another example, an apparatus for communication includes means for transmitting, from an electronic device in a neighbor awareness network (NAN) via a first wireless protocol, a wake up message indicating discovery information associated with a second wireless protocol. The apparatus further includes means for communicating information via the NAN using the second wireless protocol after transmission of the wake up message.

One particular advantage provided by at least one of the disclosed embodiments is decreased power consumption by mobile devices. For example, a mobile device that attempts to detect and access a NAN based on one or more techniques and examples described herein may consume less power associated with detecting the NAN. Additionally, when a mobile device is already associated with a NAN (i.e., the mobile device has joined the NAN), operation of the mobile device based on one or more of the techniques and examples described herein may enable the mobile device to further reduce the power consumed when the mobile device searches for other NANs (e.g., to merge the NAN with another NAN).

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

FIG. 8 is a flowchart to illustrate a second embodiment of a method of operation of a device of a NAN;

FIG. 9 is a flowchart to illustrate a second embodiment of a method of operation of a device entering a NAN;

VI. DETAILED DESCRIPTION

Figure 1:
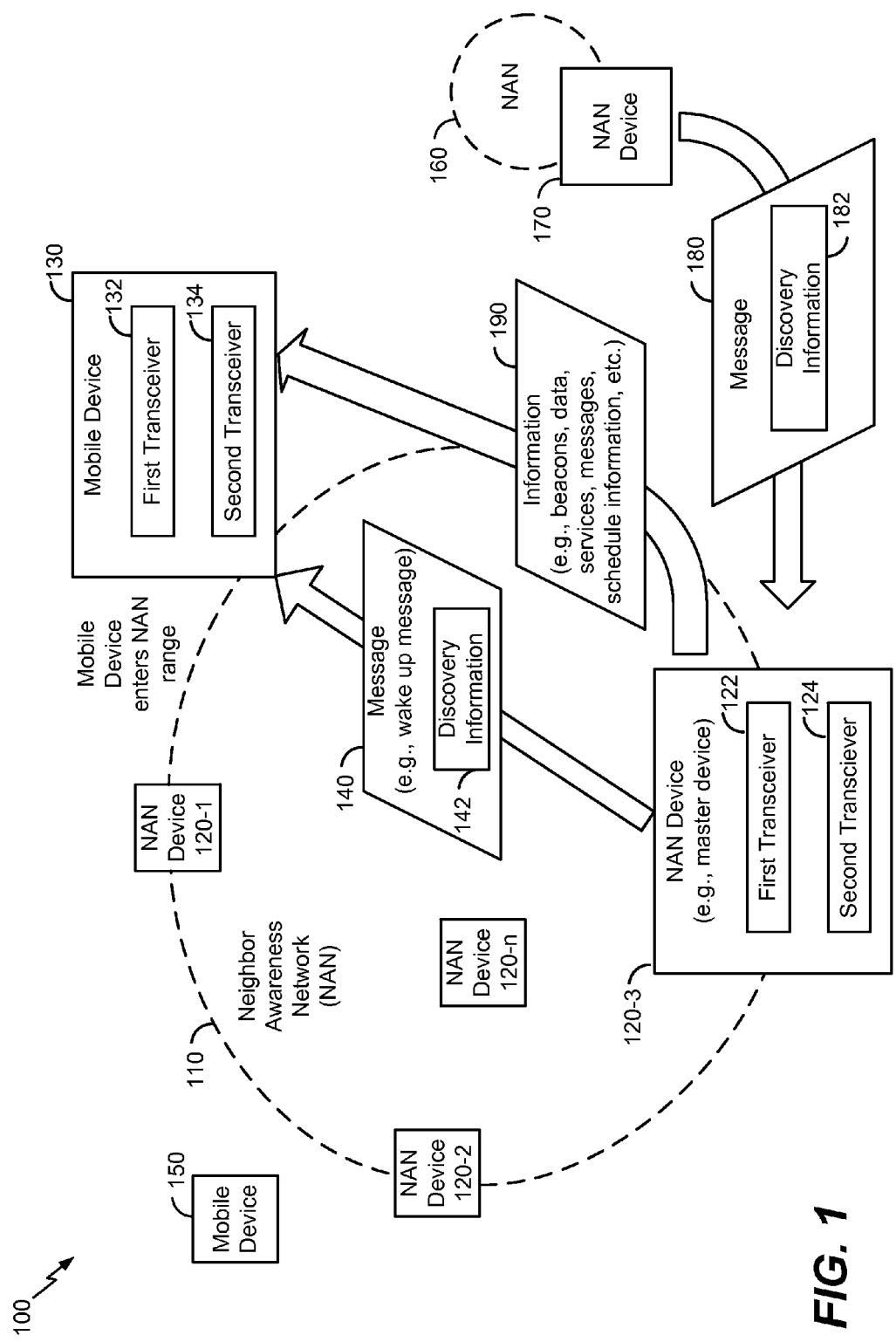
FIG. 1 is a diagram of a particular embodiment of a system that operates using a neighbor awareness network (NAN) and that supports a low power NAN discovery process.

Referring to FIG. 1, a particular embodiment of a system 100 that operates using a neighbor awareness network (NAN) 110 and that supports a low power NAN discovery process is shown. One or more devices may be associated with the NAN 110. In FIG. 1, the NAN 110 includes electronic devices, such as NAN devices 120-1, 120-2, 120-3, and 120-*n* (where "n" is a positive integer) (herein-after the "NAN devices 120"). The NAN devices 120 in the NAN 110 may exchange data, services, or both via the NAN 110. The NAN devices 120 may be "fixed" or mobile electronic devices, including but not limited to access points, mobile phones, laptop computers, tablet computers, multimedia devices, peripheral devices, data storage devices, etc.

One or more of the NAN devices 120 may include multiple radio devices (e.g., transmitters, receivers, and/or transceivers). To illustrate, FIG. 1 depicts that the NAN device 120-3 may include a first transceiver 122 and a second transceiver 124. In an illustrative example, the first transceiver 122 is configured to operate in accordance with a first wireless protocol and the second transceiver 124 is configured to operate in accordance with a second wireless protocol. Operation of the first transceiver 122 based on the first wireless protocol may result in a lower power consumption of the NAN device 120-3 as compared to operation of the second transceiver 124 based on the second wireless protocol. To illustrate, in some cases, operation of a radio device using a wireless protocol associated with a higher carrier frequency (or bandwidth) may result in a higher power consumption of the radio device as compared to operation of a radio device using a wireless protocol associated with a lower carrier frequency (or bandwidth). In this example, the first wireless protocol may be associated with a first frequency (or frequency band) that is less than a second frequency (or frequency band) associated with the second wireless protocol.

To further illustrate, the first wireless protocol may be associated with a sub-1 gigahertz (GHz) frequency band, and the second wireless protocol may be associated with frequency band of 1 GHz or more, such as a 2.4 GHz frequency band or a 5 GHz frequency band. For example, the first wireless protocol may be an Institute of Electrical and Electronics Engineers (IEEE) 802.11ah wireless protocol, and the second wireless protocol may be an IEEE 802.11a wireless protocol, an IEEE 802.11b wireless protocol, an IEEE 802.11g wireless protocol, an IEEE 802.11n wireless protocol, an 802.11ac wireless protocol, or an IEEE 802.11ad wireless protocol, as illustrative examples.

In another example, both the first wireless protocol and the second wireless protocol are associated with frequency bands of 1 GHz or more. For example, the first wireless protocol may be associated with a 2.4 GHz frequency band, and the second wireless protocol may be associated with a 5 GHz frequency band. In certain implementations, the first wireless protocol may be one of an IEEE 802.11a wireless protocol, an IEEE 802.11b wireless protocol, an IEEE 802.11g wireless protocol, an IEEE 802.11n wireless protocol, an 802.11ac wireless protocol, and an IEEE 802.11ad wireless protocol, and the second wireless protocol may be another of the IEEE 802.11a wireless protocol, the IEEE 802.11b wireless protocol, the IEEE 802.11g wireless protocol, the IEEE 802.11n wireless protocol, the 802.11ac wireless protocol, and the IEEE 802.11ad wireless protocol. In other implementations, one or both of the first wireless protocol and the second wireless protocol may correspond to other wireless protocols.

Further, it should be appreciated that although certain operations described herein are described with reference to a "transceiver," in some cases data receiving operations may be implemented using a receiver that is separate from a transmitter used to perform data transmitting operations. In addition, although certain operations are described herein with reference to a "receiver" or a "transmitter," in some embodiments a transceiver may perform both data receiving and data transmitting operations.

FIG. 1 also illustrates a mobile device 130 that has entered or is entering a coverage area (e.g., "range") of the NAN 110. FIG. 1 also depicts a mobile device 150 that is outside the coverage area of the NAN 110. One or more mobile (e.g., non-fixed) devices may enter and exit the NAN 110 at various times during operation. In accordance with the described techniques, the mobile device 130 may include multiple radio devices, such as a first transceiver 132 and a second transceiver 134. The first transceiver 132 may be configured to operate using the first wireless protocol described with reference to the first transceiver 122 of the NAN device 120-3 (e.g., to receive one or more communications from the first transceiver 122 in accordance with the first wireless protocol). The second transceiver 134 may be configured to operate using the second protocol described with reference to the second transceiver 124 of the NAN device 120-3 (e.g., to receive one or more communications from the second transceiver 124 in accordance with the second wireless protocol). In a particular embodiment, the first transceiver 132 may be an always-on receiver or a wake up receiver of the mobile device 130, and the second transceiver 134 may be selectively activated and deactivated (e.g., on an "as needed" basis) to conserve power.

Operation using the first transceiver 122 may result in a lower power consumption of the NAN device 120-3 as compared to operation using the second transceiver 124. The first transceiver 122 may be referred to as a "low power consuming device," and the second transceiver 124 may be referred to as a "high power consuming device." Further, operation using the second transceiver 134 may result in a higher power consumption of the mobile device 130 as compared to operation using the first transceiver 132. The first transceiver 132 may be referred to as a "low power consuming device," and the second transceiver 134 may be referred to as a "high power consuming device."

During operation, one or more mobile devices may enter or exit a coverage area (or range) of the NAN 110. To illustrate, the example of FIG. 1 depicts that the mobile device 130 has entered (or is entering) the NAN 110, and the mobile device 150 is outside the coverage area of the NAN 110.

Upon entering the coverage area of the NAN 110, the mobile device 130 may perform NAN discovery operations to determine whether a NAN (e.g., the NAN 110) is available (e.g., to determine whether the mobile device 130 is within range of a NAN). A NAN protocol of the NAN 110 (e.g., the second wireless protocol) may specify the periodic broadcast of a discovery beacon that notifies newly arriving mobile devices (e.g., the mobile device 130) when the next NAN discovery window will occur. During the NAN discovery window, devices (e.g., the NAN devices 120 and the mobile device 130) may perform discovery operations, including but not limited to identifying other devices in the NAN, identifying services provided by devices in the NAN, transferring data to other devices in the NAN, "joining" (or associating with) the NAN, or scheduling a future data transfer (e.g., a data transfer after the conclusion of the discovery window).

Discovery beacons may be transmitted by an "anchor master" device of the NAN 110 or other "master" device(s) of the NAN 110. In a NAN, a master device may be responsible for transmitting a synchronization beacon at the start of each NAN discovery window. In some embodiments, the synchronization beacon is transmitted via a device that operates based on the second protocol (e.g., by the second transceiver 124). The synchronization beacon may be received and used by other (e.g., non-master)

devices in the NAN to synchronize clock signals of the devices to a clock signal of the anchor master device. In some embodiments, the anchor master device may also be responsible for scheduling discovery windows. For example, discovery windows may be 16 milliseconds (ms) in duration and may occur every 512 ms. In alternate embodiments, discovery windows may have a different duration or may occur according to a different periodicity. If the anchor master device of a NAN leaves the NAN, another device may become the anchor master device. In a particular embodiment, to balance power consumption, the role of master device may periodically be transferred to a different NAN device.

To reduce power consumption of the mobile device 130 that may be caused by "searching" for synchronization beacons, discovery beacons, and/or other NAN communications, the mobile device 130 may receive a message 140 from an electronic device of the NAN 110 (e.g., from the NAN device 120-3). For example, the NAN device 120-3 may transmit the message 140 in accordance with the first wireless protocol using the first transceiver 122, which may enable the mobile device 130 to receive the message 140 in accordance with the first wireless protocol using the first transceiver 132 (e.g., while one or both of the second transceiver 124 and the second transceiver 134 operate according to a high power consuming state). The message 140 may be a "wake up" message that indicates that the mobile device 130 is to activate (or "wake up") the second transceiver 134 to receive one or more NAN communications (e.g., from the second transceiver 134 of the NAN device 120-3) transmitted using the second wireless protocol. In this example, the mobile device 130 may be configured to deactivate the second transceiver 134 (or put the second transceiver 134 to sleep) while the mobile device 130 is not using (or not scheduled to use) the second transceiver 134.

The message 140 may indicate discovery information 142 associated with the NAN 110. For example, the discovery information 142 may indicate a transmission time of a discovery beacon associated with the NAN 110, such as a discovery beacon that is to be transmitted by the NAN device 120-3 via a 2.4 GHz frequency band or a 5 GHz frequency band using the second transceiver 124. In this example, the discovery information 142 may indicate when the mobile device 130 should "wake up" the second transceiver 134 to detect and receive the discovery beacon. In a particular embodiment, the message 140 may be a beacon, a physical layer (PHY) message, a management message, or another type of message. In a particular embodiment, the message 140 is transmitted by the master device of the NAN 110 (which may correspond to the NAN device 120-3, as an illustrative example).

The message 140 may indicate the transmission time of the discovery beacon using one or more techniques. For example, the message 140 may be transmitted at a "known" (e.g., predetermined, pre-negotiated, or standardized) time offset prior to the discovery beacon, and the mobile device 130 may determine the transmission time of the discovery beacon based on the known time offset. As another example, the message 140 may include data (e.g., payload data) that identifies the transmission time of the discovery beacon. The mobile device 130 may activate the second transceiver 134 to detect the discovery beacon, which identifies the next NAN discovery window (e.g., when the next NAN discovery window will occur). The mobile device 130 may determine a start time of the NAN discovery window based on the discovery beacon.

In some cases, the mobile device 130 may deactivate the second transceiver 134 (to conserve power) after receiving the discovery beacon, and the mobile device 130 may reactivate the second transceiver 134 based on the start time of the discovery window (e.g., to perform one or more discovery operations during the discovery window, such as to "join" the NAN 110).

Devices (e.g., NAN devices or mobile devices) may use the second wireless protocol to communicate information via the NAN 110, such as information 190. For example, FIG. 1 shows that the NAN device 120-3 may transmit the information 190 to the mobile device 130. As an illustrative example, the information 190 may include a discovery beacon, a synchronization beacon, data, an indication of one or more NAN services associated with the NAN 110, NAN schedule information associated with the NAN 110, one or more messages (e.g., one or more messages transmitted at different times), or a combination thereof, as illustrative examples.

The mobile device 130 may use the second wireless protocol to communicate information via the NAN 110 (e.g., during or after the discovery window) with any of the NAN devices 120. For example, although FIG. 1 depicts the NAN device 120-3 transmitting the information 190, in another example, the mobile device 130 may transmit information (e.g., the information 190) to any of the NAN devices 120 using the second wireless protocol. To illustrate, the mobile device 130 may transmit the information 190 to the NAN device 120-3 using the second transceiver 134. As an illustrative example, the information 190 may include a discovery beacon (e.g., after the mobile device 130 joins the NAN 110), a synchronization beacon (e.g., if the mobile device 130 joins the NAN 110 and becomes a master device of the NAN 110), data, an indication of one or more NAN services associated with the NAN 110, NAN schedule information associated with the NAN 110, one or more messages (e.g., one or more messages transmitted at different times), or a combination thereof, as illustrative examples. As another example, the mobile device 130 may communicate information via the NAN 110 with any of the NAN devices 120, such as by receiving one or more messages using the second transceiver 134, by transmitting one or more messages using a transmitter that operates based on the second wireless protocol, or a combination thereof.

In some cases, the mobile device 130 may deactivate the second transceiver 134 after the discovery window (e.g., until a next discovery window associated with the NAN 110 or until receiving another message indicating discovery information associated with another NAN). An example of operation in which the mobile device 130 receives a wake up message indicating the transmission time of a discovery beacon is further described with reference to FIG. 2.

Alternatively or in addition to indicating a transmission time of a discovery beacon, the message 140 may indicate an upcoming discovery window (e.g., a start time of a discovery window). For example, the message 140 may be transmitted at a "known" offset from the start of a next discovery window. The mobile device 130 may receive the message 140 based on the first wireless protocol using the first transceiver 132 and may determine a start time of the discovery window based on the message 140. The mobile device 130 may activate the second transceiver 134 based on the start time of the discovery window (e.g., to perform one or more discovery operations during the discovery window, such as to "join" the NAN 110). The mobile device 130 may use the second wireless protocol to communicate information (e.g., the information 190) via the NAN 110 (e.g., during or after the discovery window) with any of the NAN devices 120, such as by receiving one or more messages using the second transceiver 134, by transmitting one or more messages using a transmitter that operates based on the second wireless protocol, or a combination thereof. In some cases, the mobile device 130 may deactivate the second transceiver 134 after the discovery window (e.g., until a next discovery window associated with the NAN 110 or until receiving another message indicating discovery information associated with another NAN). An example of operation in which the mobile device 130 receives a wake up message indicating a discovery window is further described with reference to FIG. 3.

In a particular embodiment, when wake up messages, and not discovery beacons, are used to determine when a next discovery window will occur, NAN devices may avoid transmitting discovery beacons (or may reduce how often discovery beacons are transmitted). Reducing or eliminating discovery beacons may reduce a number of communications transmitted using the NAN 110. An example of operation in which NAN devices avoid transmitting discovery beacons is further described with reference to FIG. 4.

In a particular embodiment, transmission of the message 140 may be triggered by a preceding transmission from a searching device (e.g., the mobile device 130). To illustrate, the NAN device 120-3 may operate using a low power receive mode (e.g., by operating a low power consuming receiver or transceiver) and may detect a trigger message (e.g., a probe request) transmitted by the mobile device 130. Based on the detected trigger message, the NAN device 120-3 may determine that a device (e.g., a "candidate" device) that is not yet part of the NAN 110 is in range of the NAN 110. The NAN device 120-3 may remain in the low power receive mode and may transmit a response (e.g., a probe response), which may correspond to the message 140. Use of probe messages is described further with reference to FIG. 5.

In some cases, one or more devices illustrated in FIG. 1 may be associated with multiple NANs (e.g., simultaneously or sequentially). To illustrate, FIG. 1 depicts a NAN 160. The NAN 160 may operate in accordance with the second wireless protocol. The NAN 160 may include one or more NAN devices, such as a NAN device 170.

The NAN device 170 may transmit a message 180 (e.g., a wake up message), which may correspond to the message 140. The message 180 may be received by another device, such as the NAN device 120-3. The message 180 may indicate discovery information 182 associated with the NAN 160. For example, the discovery information 182 may indicate a transmission time of a discovery beacon associated with the NAN 160, a time indication of a discovery window of the NAN 160, or a combination thereof. In some cases, the message 180 may be a probe response that is transmitted in response to a probe request by the NAN device 120-3. During operation, a device of the NAN 110 (e.g., the NAN device 120-3) may choose to "join" the NAN 160 alternatively or in addition to the NAN 110. The device of the NAN 110 may join the NAN 160 and may perform a NAN discovery process based on the received message 180 (e.g., to join the NAN 160 and/or to "merge" the NAN 110 and the NAN 160). In a particular embodiment, the device of the NAN 110 may be part of multiple NANs at the same time or may merge/bridge multiple NANs together into a larger NAN.

The system 100 of FIG. 1 may thus support various embodiments of a low power NAN discovery process in which the mobile device 130 receives the message 140. Instead of operating a high power consuming device (e.g., the second transceiver 134) for 100-200 ms to detect a discovery beacon, the mobile device 130 may selectively activate the high power consuming device at an appropriate time (as determined from the message 140) to receive the discovery beacon and communicate in a NAN during a discovery window.

It should be noted that although one or more embodiments are described herein with reference to a device entering a NAN, the described low power NAN discovery processes may also be used by devices that are already part of a NAN, such as the NAN 110. For example, after joining the NAN 110, the mobile device may receive a message (e.g., a wake up message) associated with a second NAN. The second NAN may "overlap" the NAN 110 (e.g., multiple NANs may "share" one or more electronic devices, such as one or more of the NAN devices 120). The mobile device 130 may use the received message to determine a transmission time of a discovery beacon in the second NAN, a start time of a discovery window in the second NAN, or a combination of both. The mobile device 130 may join the second NAN and may perform a NAN discovery process based on the received message (e.g., to join the second NAN and/or to "merge" the NAN 110 and the second NAN). In a particular embodiment, a device may be part of multiple NANs at the same time or may merge/bridge multiple NANs together into a larger NAN.

Figure 2:
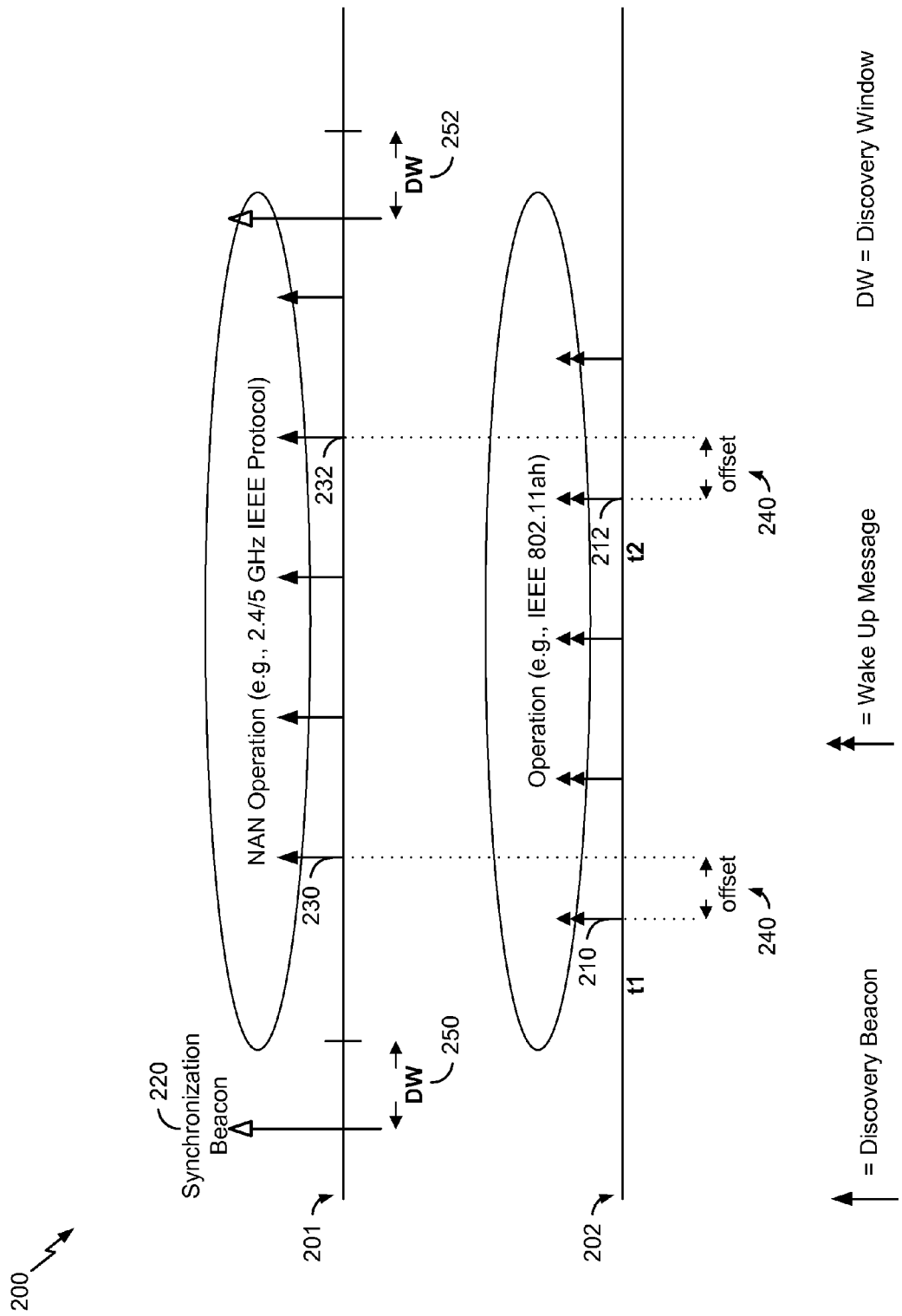
FIG. 2 is a diagram to illustrate a first embodiment of operation at the system of FIG. 1.

FIG. 2 illustrates a first embodiment of a NAN discovery process and is generally designated 200. In FIG. 2, NAN operation is illustrated along a first horizontal axis 201 and operation resulting in low power consumption at a device (e.g., operation associated with an IEEE 802.11ah wireless protocol) is illustrated along a second horizontal axis 202. From left-to-right, the horizontal axes 201, 202 represent time. The operations described with reference to FIG. 2 may be performed in connection with the NAN 110 of FIG. 1.

As shown in FIG. 2, one or more NAN devices (e.g., any of the NAN devices 120 of FIG. 1) may periodically transmit wake up messages via a low power consuming device (e.g., the first transceiver 122) associated with a first wireless protocol, such as the first wireless protocol described with reference to FIG. 1. In some cases, the wake up messages may be transmitted by a master device of the NAN 110. As an illustrative example, the NAN device 120-3 may function as the master device of the NAN 110, and the NAN device 120-3 may transmit the message 140 of FIG. 1.

When a first mobile device (e.g., the mobile device 130 of FIG. 1) arrives in a NAN coverage area at a time t1, the first mobile device may receive a first wake up message 210 via a low power consuming device (e.g., the first transceiver 132) that is associated with the first wireless protocol. The first wake up message 210 may be transmitted at a "known" time offset 240 prior to a first discovery beacon 230 that is to be transmitted using the NAN via a high power consuming device (e.g., the second transceiver 124) associated with a second wireless protocol, such as the second wireless protocol described with reference to FIG. 1. The first discovery beacon 230 may be included in the information 190 of FIG. 1. The first mobile device may receive the first discovery beacon 230 via a high power consuming device (e.g., the second transceiver 134) that is associated with the second wireless protocol and may determine a start time of a next discovery window (DW) 252 based on the first discovery beacon 230.

When a second mobile device (e.g., the mobile device 150 of FIG. 1) arrives in the NAN coverage area at a time t2, the second mobile device may receive a second wake up message 212 via a low power consuming device that is associated with the first wireless protocol. The second wake up message 212 may be transmitted by one of the NAN devices 120, such as the NAN device 120-3. The second wake up message 212 may have one or more features corresponding to the message 140 of FIG. 1.

The second wake up message 212 may be transmitted at the "known" time offset 240 prior to a second discovery beacon 232 that is to be transmitted using the NAN via the high power consuming device. The second mobile device may receive the second discovery beacon 232 via a high power consuming device that is associated with the second wireless protocol and may determine a start time of the next discovery window (DW) 252 based on the second discovery beacon 232. During the discovery window 252, both the first mobile device and the second mobile device may activate respective high power consuming devices (e.g., transmitters, receivers, transceivers, etc.) and may perform one or more NAN discovery operations. As shown in FIG. 2, a synchronization beacon 220 may be transmitted at the start of each discovery window (e.g., for clock synchronization purposes).

Figure 3:
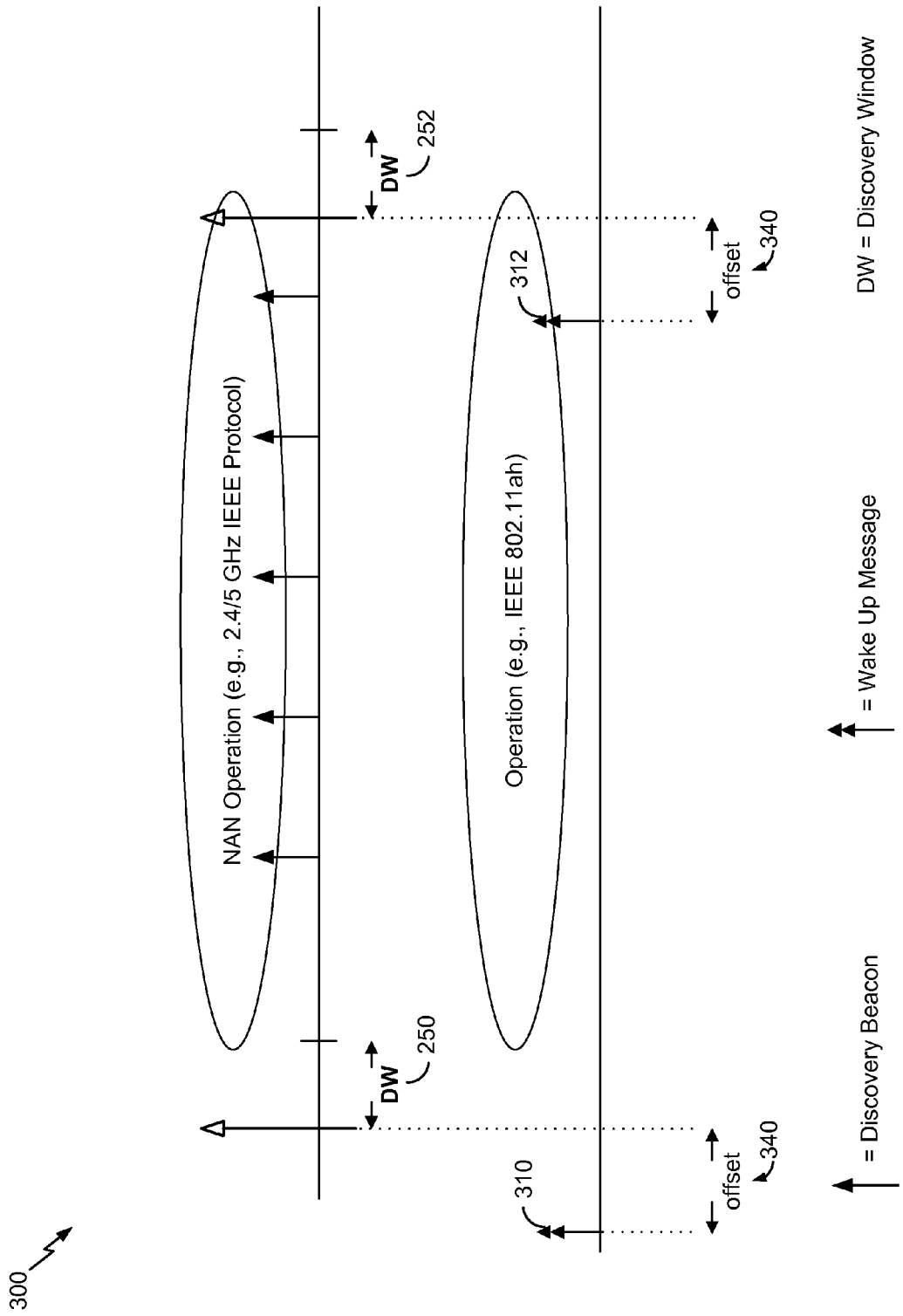
FIG. 3 is a diagram to illustrate a second embodiment of operation at the system of FIG. 1.

FIG. 3 illustrates a second embodiment of a NAN discovery process and is generally designated 300. The operations described with reference to FIG. 3 may be performed in connection with the NAN 110 of FIG. 1. In FIG. 3, wake up messages are transmitted at a "known" time offset 340 prior to the start of a discovery window (e.g., instead of at a "known" time offset prior to a discovery beacon, such as in FIG. 2).

For example, a first wake up message 310 may be transmitted by one of the NAN devices 120 (e.g., by the NAN device 120-3) at the "known" time offset 340 prior to the start of a first discovery window 250. Similarly, a second wake up message 312 may be transmitted by one of the NAN devices 120 (e.g., by the NAN device 120-3) at the "known" time offset 340 prior to the start of the discovery window 252. One or both of the wake up messages 310, 312 may have one or more features corresponding to the message 140 of FIG. 1. One or both of the wake up messages 310, 312 may be transmitted in accordance with the first wireless protocol described with reference to FIG. 1, such as using the first transceiver 122.

A mobile device (e.g., the mobile device 130) may receive the wake up message 310 or 312 using a receiver or transceiver that operates based on the first wireless protocol described with reference to FIG. 1 (e.g., using the first transceiver 132). In response to receiving the wake up message 310 or 312, the mobile device may determine when the next discovery window 250 or 252 will occur without activating a high power consuming device to receive a discovery beacon (such as in the example of FIG. 2).

Figure 4:
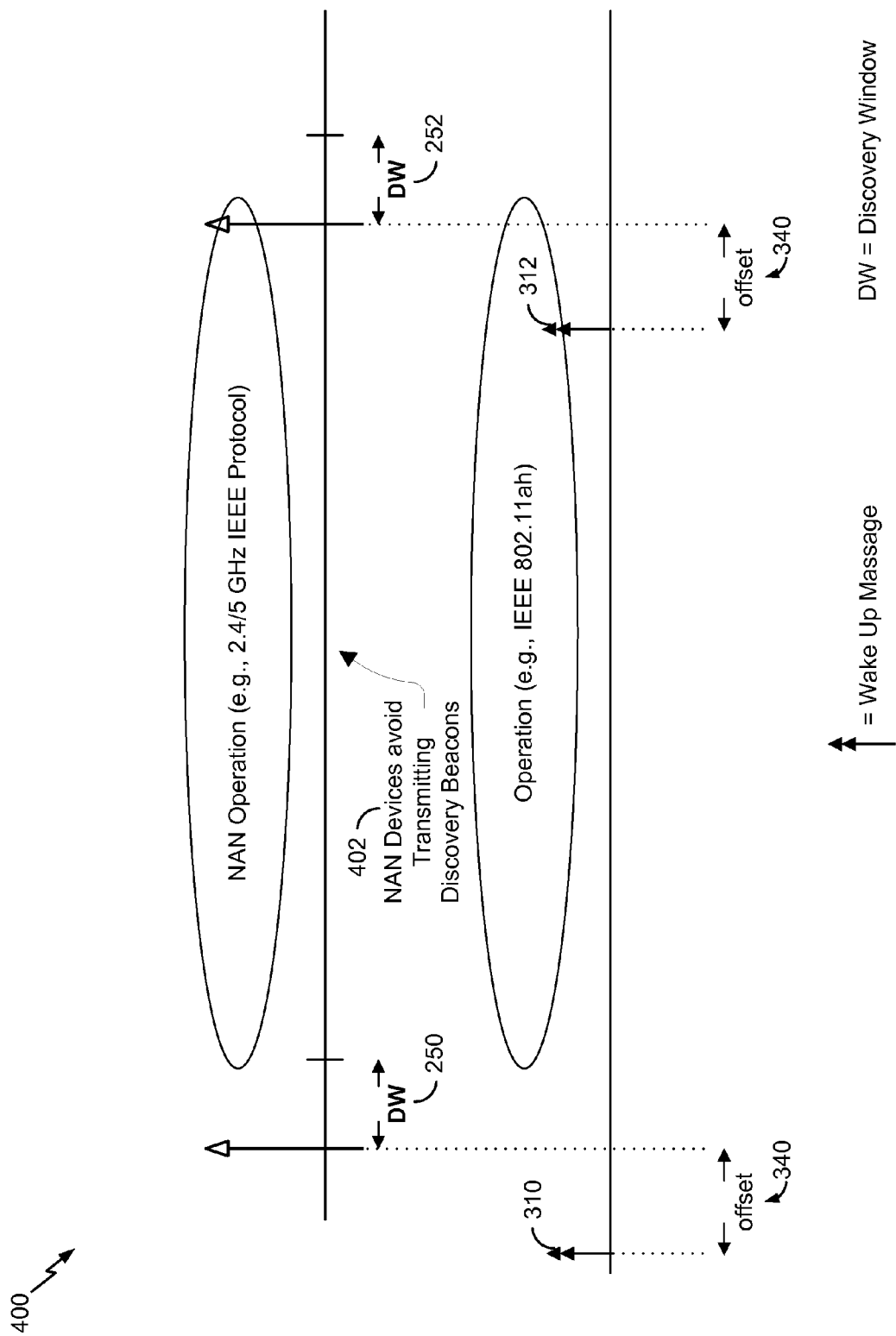
FIG. 4 is a diagram to illustrate a third embodiment of operation at the system of FIG. 1.

FIG. 4 illustrates a third embodiment of a NAN discovery process and is generally designated 400. The operations described with reference to FIG. 3 may be performed in connection with the NAN 110 of FIG. 1. In contrast with FIG. 3, in FIG. 4, NAN devices (e.g., the NAN devices 120 of FIG. 1) avoid transmitting discovery beacons, as shown at 402. Newly arriving devices (e.g., the mobile device 130) may utilize the wake up messages 310, 312 to determine when the next discovery window 250, 252 will occur without use of discovery beacons. Reducing or eliminating the transmission of discovery beacons as in FIG. 4, may reduce communications transmitted using the NAN 110 and may reduce power consumption by NAN devices.

When performing network discovery, the mobile device 130 may engage in "passive" scanning or "active" scanning.

In passive scanning (e.g., as described with reference to FIGS. 1-4), the mobile device 130 may "listen" or "wait" for a message (e.g., the message 140) that is transmitted via a low power consuming device associated with a first wireless protocol. During active scanning, the mobile device 130 may actively request NAN discovery information from one or more of the NAN devices 120.

Figure 5:
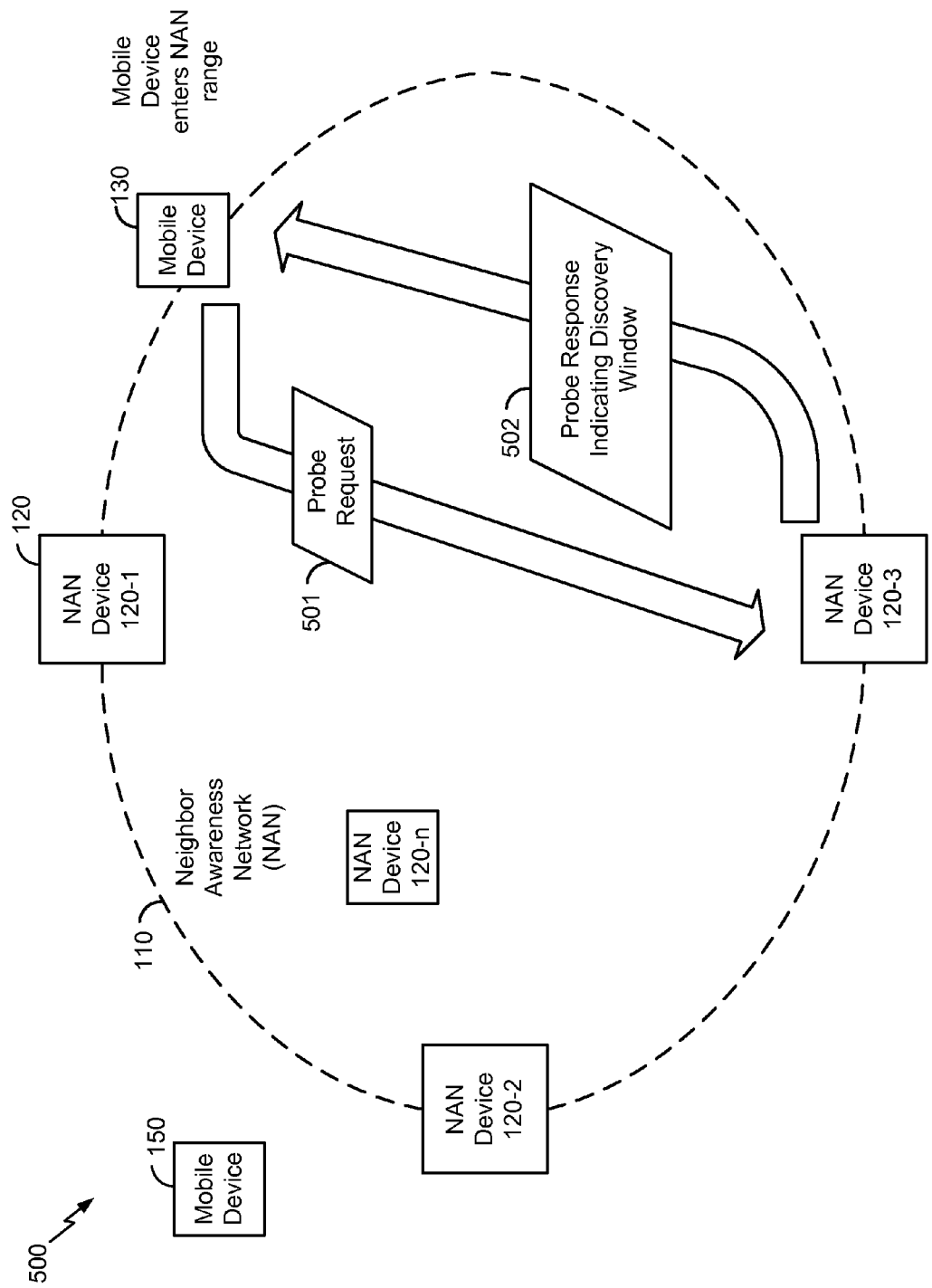
FIG. 5 is a diagram of another particular embodiment of a system that includes a NAN and that supports a low power NAN discovery process.

FIG. 5 illustrates a particular embodiment of a system 500 that is operable to support low power NAN discovery processes using active scanning. The system 500 includes the NAN 110 of FIG. 1, the NAN devices 120 of FIG. 1, and the mobile devices 130, 150 of FIG. 1.

During operation, the mobile device 130 may transmit a probe request 501 (e.g., a probe request message or frame) via a high power consuming device associated with a second wireless protocol (e.g., via the second transceiver 134 using the second wireless protocol of FIG. 1) that is associated with the NAN. Alternatively or in addition, the mobile device 130 may transmit a probe request (such as the probe request 501) via a low power consuming device associated with a first wireless protocol (e.g., the first transceiver 132 using the first wireless protocol of FIG. 1).

One or more of the NAN devices 120 may receive the probe request 501. For example, in the example of FIG. 5, the NAN device 120-3 may receive the probe request 501. In response to receiving the probe request 501, the NAN device 120-3 may transmit a probe response 502 (e.g., the message 140 of FIG. 1) to the mobile device 130 (e.g., via the first wireless protocol using the first transceiver 122 or via the second wireless protocol using the second transceiver 124). The probe response 502 indicates discovery information, such as the discovery information 142 of FIG. 1. To illustrate, the probe request may indicate a transmission time of a discovery beacon, an upcoming discovery window (e.g., schedule/timing information associated with the upcoming discovery window), or a combination thereof. In a particular embodiment, the NAN device 120-3 receives the probe request 501 using a low power receive mode of operation. The low power receive mode may correspond to the first wireless protocol.

In a particular embodiment, the NAN devices 120 may "take turns" transitioning between the low power receive mode (in which probe requests such as the probe request 501 can be detected/received) and a power-save mode (in which probe requests are not detected/received). In this example, the NAN devices 120 may operate according to a low power receive mode schedule that determines when each of the NAN devices 120 is to use the low power receive mode. If the number of NAN devices 120 of the NAN 110 increases, each of the NAN devices 120 may remain in the receive mode to detect/receive probe requests for a shorter duration of time (because a greater number of NAN devices "share" the low power receive mode). In a particular embodiment, each of the NAN devices 120 spends the same amount of time in the receive mode and in the power-save mode (e.g., each of the NAN devices 120 switches modes according to a common switching time period). However, receive mode operation of the NAN devices 120 may be staggered, so that at least a threshold number of NAN devices 120 are available to receive/detect probe requests at any given time.

It should be appreciated the NAN devices 120 may use communications (e.g., transmitted via the NAN 110) to determine the low power receive mode schedule. As an illustrative example, the master device of the NAN 110 may determine a low power receive mode schedule and may "assign" a corresponding low power receive mode time interval to each of the NAN devices 120-3 (during which the low power receive mode is to be used to detect any probe requests, such as the probe request 501). In another example, a newest device to "join" the NAN 110 may be responsible for using the low power receive mode. To illustrate, if the mobile device 130 joins the NAN 110 upon entering the coverage area of the NAN 110, the mobile device 130 may be responsible for using the low power receive mode to receive any probe requests from newly arriving devices (e.g., from the mobile device 150 of FIG. 1).

The system 500 of FIG. 5 may thus support low power NAN discovery processes using active scanning, in which the mobile device 130 transmits the probe request 501 and receives the probe response 502. Instead of operating a high power consuming device (e.g., the second transceiver 134) associated with the second wireless protocol for 100-200 ms to detect a discovery beacon, the mobile device 130 may selectively activate a high power consuming device (e.g., the first transceiver 132) at an appropriate time (as determined from the probe response 502) to participate in a discovery window.

Figure 6:
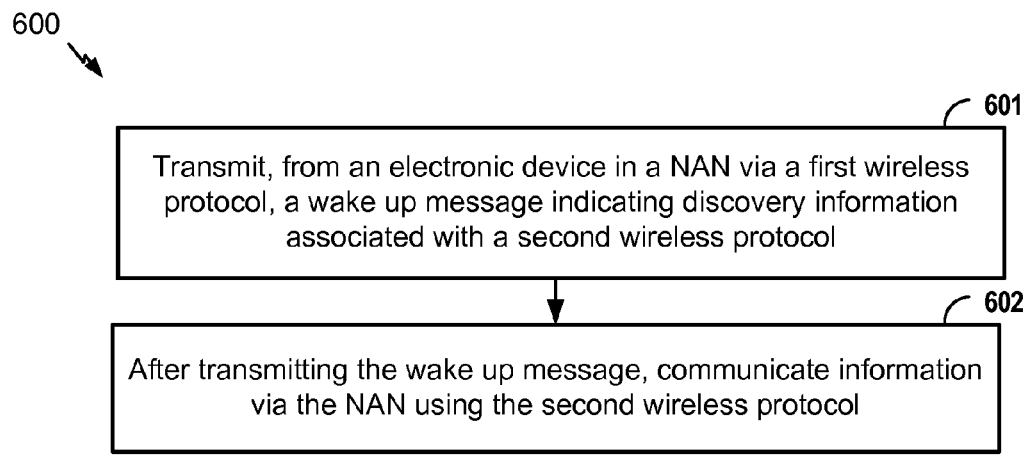
FIG. 6 is a flowchart to illustrate a first embodiment of a method of operation of a device of a NAN.

Referring to FIG. 6, a first embodiment of a method 600 of operation (e.g., communication) of an electronic device is shown. For example, the electronic device may be a NAN device, such as one of the NAN devices 120 of FIG. 1.

The method 600 may include transmitting, from the electronic device (e.g., the NAN device 120-3) via a NAN (e.g., the NAN 110) via a first wireless protocol, a wake up message (e.g., the message 140 or the wake up message 210) that indicates discovery information (e.g., the discovery information 142) associated with a second wireless protocol, at 601. For example, one of the NAN devices 120 may transmit the wake up message to the mobile device 130 in accordance with the first wireless protocol, and the mobile device 130 may receive the wake up message in accordance with the first wireless protocol. The discovery information is associated with the second wireless protocol. For example, the discovery information may indicate a transmission time of a discovery beacon that is to be transmitted in accordance with the second wireless protocol, a discovery window during which devices communicate in accordance with the second wireless protocol, or a time indication of the discovery window during which devices communicate in accordance with the second wireless protocol, as illustrative examples. In this example, the method 600 may further include indicating a transmission time of the discovery beacon (e.g., in the discovery information) or transmitting the discovery beacon (e.g., in the information communicated via the NAN). The discovery window may have a duration of approximately 16 milliseconds (ms).

The wake up message may be transmitted using a low power consuming device of the electronic device, and the low power consuming device may be associated with the first wireless protocol. To illustrate, the low power consuming device may correspond to the first transceiver 122, which is associated with the first wireless protocol described with reference to FIG. 1.

In a particular embodiment, the first wireless protocol is associated with a sub-1 GHz frequency band, and the second wireless protocol is associated with a 2.4 GHz frequency band. The first wireless protocol may be an IEEE 802.11ah wireless protocol, as an illustrative example. In another example, the first wireless protocol is associated with a sub-1 GHz frequency band, and the second wireless protocol is associated with a 5 GHz frequency band. In another example, the first wireless protocol is associated with a 2.4 GHz frequency band, and the second wireless protocol is associated with a 5 GHz frequency band. In other cases, the first wireless protocol and the second wireless protocol may correspond to other wireless protocols that are associated with other frequency bands. In some implementations, the electronic device corresponds to a master device of the NAN 110.

In some examples, the discovery information indicates a transmission time of a discovery beacon associated with the second wireless protocol. For example, referring to FIG. 2, the discovery beacon may correspond to the discovery beacon 230 or the discovery beacon 232, and transmitting the wake up message may occur at a particular time offset (e.g., the time offset 240) prior to transmission of the discovery beacon.

In another example, the discovery information indicates a discovery window associated with the second wireless protocol. For example, referring to FIG. 3, the discovery window may correspond to the discovery window 250 or the discovery window 252. Transmitting the wake up message may occur at a particular time offset (e.g., the time offset 340) prior to a start of the discovery window. In some implementations, the discovery window has a duration of approximately 16 milliseconds (ms). Further, in some cases, devices in the NAN avoid transmitting discovery beacons via the second wireless protocol. For example, referring to FIG. 4, NAN devices may avoid transmitting discovery beacons via the second wireless protocol, at 402.

In some cases, the wake up message is a probe response (e.g., the probe response 502 of FIG. 5). To illustrate, the wake up message may be transmitted by the electronic device in response to detecting a trigger message (e.g., the probe request 501) transmitted by a mobile device (e.g., the mobile device 130).

The method 600 may further include communicating information via the NAN using the second wireless protocol after transmitting the wake up message, at 602. For example, the electronic device may communicate information via the NAN 110, such as the information 190 of FIG. 1. To illustrate, FIG. 1 shows that the NAN device 120-3 may transmit the information 190 to the mobile device 130. For example, the information 190 may include a beacon (e.g., such as the discovery beacon 230 or the synchronization beacon 220 of FIG. 2), data, an indication of one or more NAN services, NAN schedule information, one or more messages (e.g., one or more messages transmitted at different times), or a combination thereof, as illustrative examples. As another illustration, the information 190 may indicate the discovery window 250, the discovery window 252. As another example, communicating via the NAN may include transmitting data to the mobile device 130, receiving data from the mobile device 130, or any combination thereof. Alternatively or in addition, the communicating information via the NAN may include communication during a discovery window associated with the NAN. It should be appreciated that one or more of the discovery beacon, the synchronization beacon, or the discovery window may be indicated by the discovery information of the wake up message, transmitted at 601.

The method 600 may optionally include receiving, at the electronic device via the first wireless protocol, a message (e.g., the message 180) from another electronic device (e.g., the NAN device 170). The message indicates discovery information (e.g., the discovery information 182) associated with another NAN (e.g., the NAN 160) that is operating in accordance with the second wireless protocol. For example, the message may indicate a transmission time of a discovery beacon associated with the another NAN, a time indication of a discovery window of the another NAN, or a combination thereof. It should be appreciated that the discovery beacon may be implemented as described with reference to any of the discovery beacons 230, 232, and the discovery window may be implemented as described with reference to any of the discovery windows 250, 252.

The method 600 of FIG. 6 may reduce power consumption of a device. For example, by using a low power consuming device associated with the first wireless protocol to transmit the wake up message, a NAN device may avoid utilizing a high power consuming device associated with the second wireless protocol when transmitting the wake up message to enable NAN discovery processes.

Figure 7:
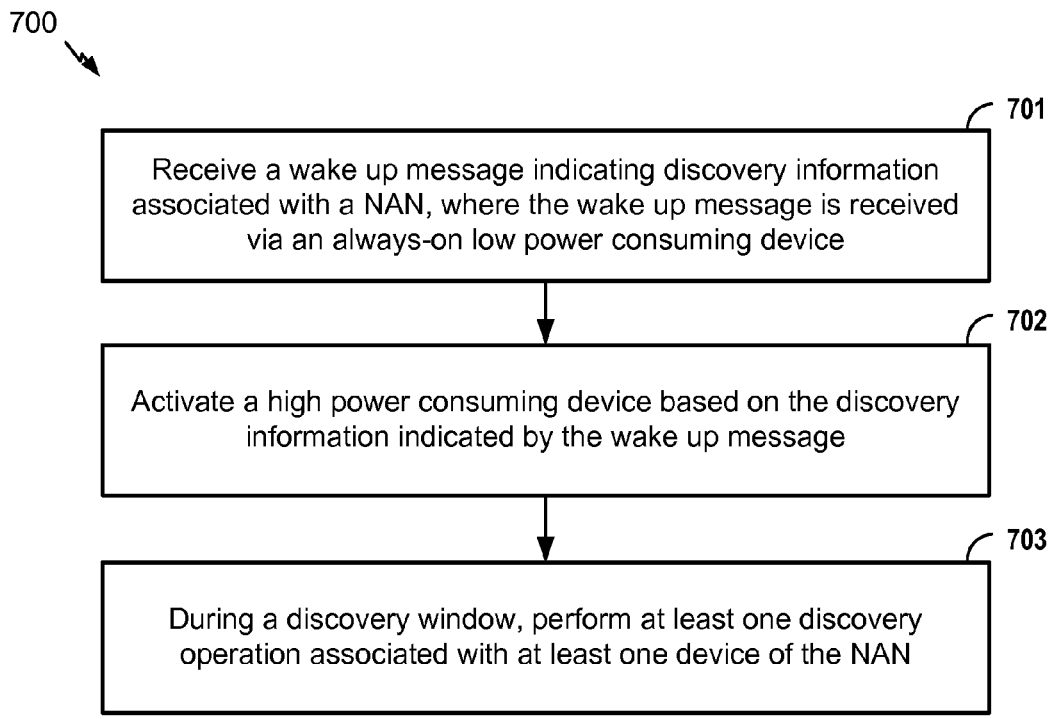
FIG. 7 is a flowchart to illustrate a first embodiment of a method of operation of a device entering a NAN.

Referring to FIG. 7, a first embodiment of a method 700 of operation of a device entering a NAN is shown. For example, the method 700 may be performed by the mobile device 130 of FIG. 1.

The method 700 may include receiving a wake up message (e.g., the message 140 or the wake up message 210 of FIG. 2) indicating discovery information (e.g., the discovery information 142) associated with a NAN (e.g., the NAN 110), at 701. The wake up message may be received via an always-on low power consuming device (e.g., a receiver or transceiver associated with a first wireless protocol, such as the first wireless protocol described with reference to FIG. 1). For example, the mobile device 130 of FIG. 1 may include a low power consuming device that uses the first wireless protocol to receive the message 140 of FIG. 1 from one of the NAN devices 120. The mobile device 130 may receive the wake up message in accordance with the first wireless protocol using the first transceiver 132.

The method 700 may further include activating a high power consuming device (e.g., the second transceiver 134) based on the discovery information indicated by the wake up message, at 702. For example, the discovery information may indicate a transmission time of a discovery beacon of the second wireless protocol, a discovery window of the second wireless protocol, or a time indication of the discovery window of the second wireless protocol, as illustrative examples.

The method 700 may further include, during a discovery window, performing at least one discovery operation associated with at least one device of the NAN (e.g., based on the discovery information of the wake up message), at 703. For example, during a discovery window (e.g., the discovery window 252 of FIG. 2), the mobile device 130 may communicate (e.g., based on the second wireless protocol) with one or more of the NAN devices 120 of FIG. 1, discover services provided by the NAN devices 120, exchange data with the NAN devices 120, schedule a later data exchange, or perform other operations.

The method 700 of FIG. 7 may reduce power consumption associated with a device. For example, by using a low power consuming device associated with the first wireless protocol to receive the wake up message, the device may avoid utilizing a high power consuming device associated with the second wireless protocol to discover a NAN.

FIGS. 8-11 describe examples of discovery information that may be indicated by the wake up message described with reference to FIGS. 6 and 7.

Referring to FIG. 8, a second embodiment of a method 800 of operation of a device of a NAN is shown. For example, the method 800 may be performed by a NAN device, such as one of the NAN devices 120 of FIG. 1.

The method 800 may include transmitting a wake up message (e.g., the message 140 or the wake up message 210) from a NAN device (e.g., the NAN device 120-3) via a first wireless protocol, at 801. For example, one of the NAN devices 120 may transmit a wake up message to the mobile device 130 via a low power consuming device (e.g., the first transceiver 122). The wake up message may indicate discovery information (e.g., the discovery information 142), such as a transmission time of a discovery beacon associated with a second wireless protocol, a transmission time of a discovery beacon associated with the second wireless protocol, or a combination thereof. In an illustrative embodiment, the wake up message may be the wake up message 210 of FIG. 2 and the discovery beacon may be the discovery beacon 230 of FIG. 2, where the wake up message 210 is transmitted at a particular time offset 240 prior to a start of the first discovery beacon 230.

The method 800 may further include communicating information via the NAN using the second wireless protocol after transmitting the wake up message, at 802. For example, one of the NAN devices 120 of FIG. 1 may communicate information, such as the information 190 of FIG. 1 via the NAN 110 of FIG. 1. To illustrate, one of the NAN devices 120 of FIG. 1 may transmit the information 190, such as a discovery beacon (e.g., one of the discovery beacons 230, 232), a synchronization beacon (e.g., the synchronization beacon 220), or a combination thereof. Alternatively or in addition, communicating the information via the NAN may include communication during a discovery window, such as the discovery window 250 or the discovery window 252.

Referring to FIG. 9, a second embodiment of a method 900 of operation of a device entering a NAN is shown. For example, the method 900 may be performed by the mobile device 130 of FIG. 1.

The method 900 may include receiving a wake up message (e.g., the message 140 or the wake up message 210) indicating a transmission time of a discovery beacon associated with a NAN, at 901. The wake up message may be received via an always-on low power consuming device (e.g., a receiver or transceiver associated with a first wireless protocol). For example, the always-on low power consuming device may correspond to the first transceiver 132 of FIG. 1. The mobile device 130 may receive the message 140 of FIG. 1 or the wake up message 210 of FIG. 2 from one of the NAN devices 120 in accordance with the first wireless protocol of FIG. 1, where the message 140 indicates a transmission time of a discovery beacon (e.g., the discovery beacon 230 of FIG. 2).

The method 900 may further include activating a high power consuming device to detect the discovery beacon based on the transmission time indicated by the wake up message, at 902. The high power consuming device may correspond to the second transceiver 134. For example, after receiving the wake up message 210 of FIG. 2, the mobile device 130 of FIG. 1 may wait for a particular amount of time and then activate the second transceiver 134 to detect the discovery beacon 230 of FIG. 2 using the second wireless protocol described with reference to FIG. 1.

The method 900 may further include determining a start time of a discovery window based on the discovery beacon, at 903. For example, after detecting the discovery beacon 230 of FIG. 2, the mobile device 130 of FIG. 1 may use information associated with the discovery beacon 230 (e.g., data in the discovery beacon 230 or a "known" offset) to determine a start time of the discovery window 252 of FIG. 2.

The method 900 may further include deactivating the high power consuming device after detecting the discovery beacon, at 904. It should be noted that determining the start time of the discovery window (at 903) and deactivating the high power consuming device (at 904) may be performed in the opposite order or at least partially concurrently. For example, after determining the start time of the discovery window 252 of FIG. 2, the mobile device 130 of FIG. 1 may deactivate its high power consuming device to conserve power. The mobile device 130 of FIG. 1 may continue to operate its always-on low power consuming device.

The method 900 may further include reactivating the high power consuming device based on the start time of the discovery window, at 905. For example, upon reaching a start time of the discovery window 252 of FIG. 2 (or at a time slightly prior to the start time to account for startup or processing delay), the mobile device 130 of FIG. 1 may reactivate the high power consuming device to access the discovery window 252.

The method 900 may further include, during the discovery window, performing at least one discovery operation associated with at least one device of the NAN, at 906. For example, during the discovery window 252, the mobile device 130 may discover the NAN devices 120, discover services provided by the NAN devices 120, exchange data with the NAN devices 120, schedule a later data exchange, or perform other operations.

Figure 10:
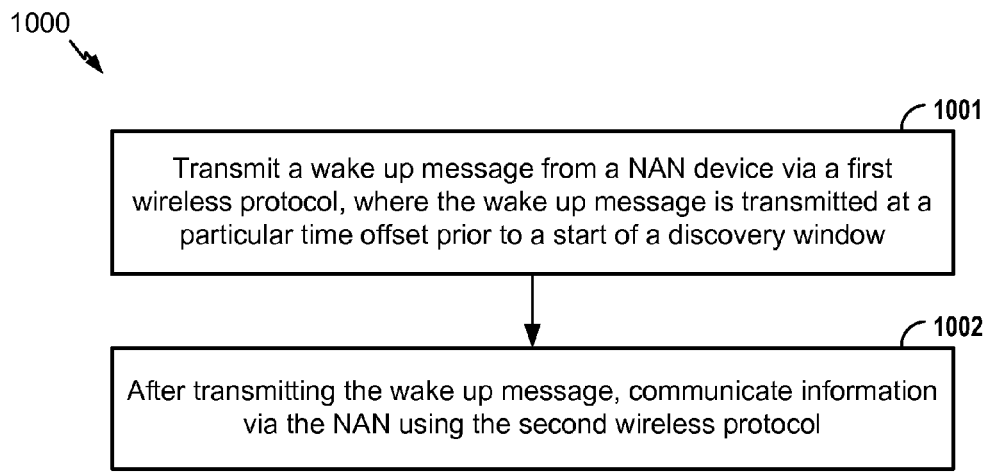
FIG. 10 is a flowchart to illustrate a third embodiment of a method of operation of a device of a NAN.

Referring to FIG. 10, a third embodiment of a method 1000 of operation of a device of a NAN is shown. For example, the method 1000 may be performed by a NAN device, such as one of the NAN devices 120 of FIG. 1.

The method 1000 may include transmitting a wake up message from a NAN device via a first wireless protocol, at 1001. The wake up message may be transmitted at a particular time offset prior to a start of a discovery window. For example, one of the NAN devices 120 of FIG. 1 may transmit the message 140 of FIG. 1 via a low power consuming device associated with a first wireless protocol (e.g., an IEEE 802.11ah wireless protocol), where the message 140 indicates an upcoming discovery window of the NAN 110. In an illustrative embodiment, the message 140 may be the wake up message 310 of FIG. 3 and the discovery window may be the discovery window 250 of FIG. 3, where the wake up message 310 is transmitted at a particular time offset 340 prior to the start of the discovery window 250.

The method 1000 may further include communicating information via the NAN using the second wireless protocol after transmitting the wake up message, at 1002. For example, one of the NAN devices 120 of FIG. 1 may communicate information via the NAN 110 of FIG. 1. To illustrate, one of the NAN devices 120 of FIG. 1 may transmit a discovery beacon (e.g., one of the discovery beacons 230, 232), a synchronization beacon (e.g., the synchronization beacon 220), or a combination thereof. Alternatively or in addition, communicating the information via the NAN may include communication during a discovery window, such as the discovery window 250 or the discovery window 252.

Figure 11:
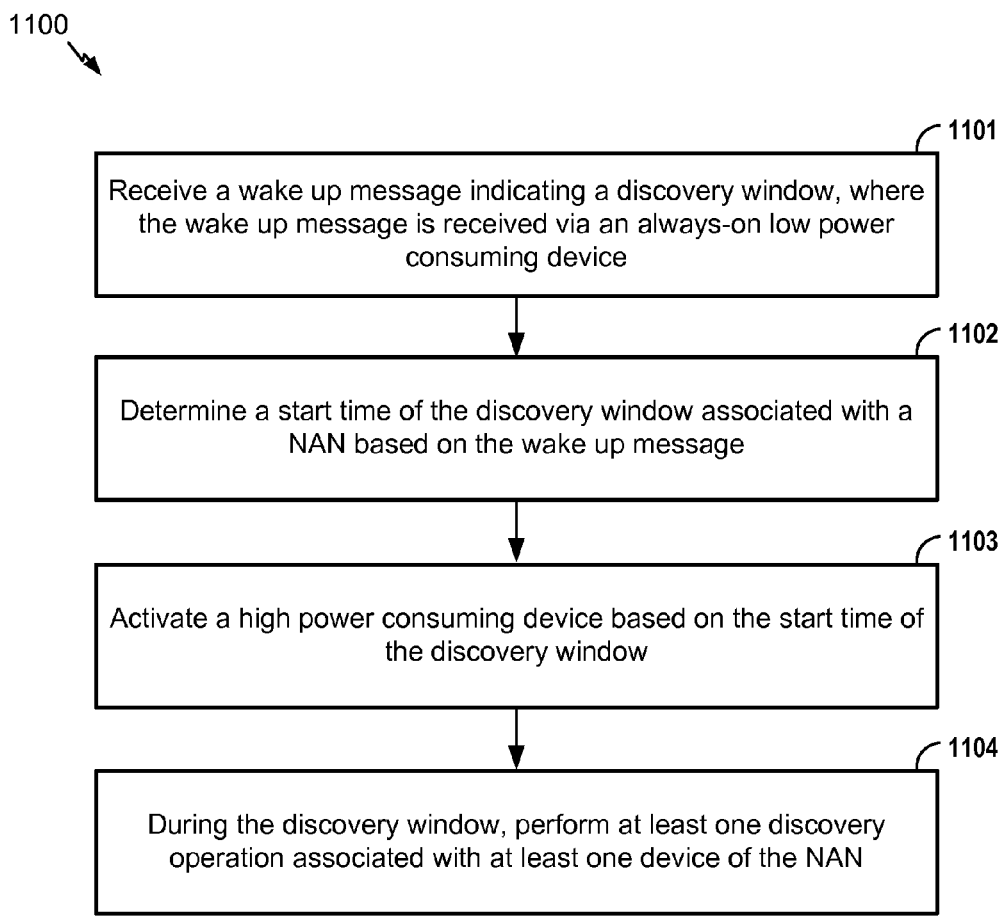
FIG. 11 is a flowchart to illustrate a third embodiment of a method of operation of a device entering a NAN.

Referring to FIG. 11, a third embodiment of a method 1100 of operation of a device entering a NAN is shown. For example, the method 1100 may be performed by the mobile device 130 of FIG. 1.

The method 1100 may include receiving a wake up message indicating a discovery window, at 1101. The wake up message may be received via an always-on low power consuming device (e.g., a receiver or transceiver associated with a first wireless protocol). For example, the mobile device 130 of FIG. 1 may receive the message 140 of FIG. 1 transmitted from one of the NAN devices 120, where the message 140 indicates a NAN discovery window. To illustrate, the message 140 may be the wake up message 310 of FIG. 3 and the discovery window may be the discovery window 250 of FIG. 3. The wake up message 310 may be transmitted at a particular time offset 340 prior to the start of the discovery window 250.

The method 1100 may further include determining a start time of the discovery window associated with a NAN based on the wake up message, at 1102. For example, after receiving the wake up message 310 of FIG. 3, the mobile device 130 of FIG. 1 may determine a start time of the discovery window 250 based on the wake up message 310 (e.g., based on data included in the wake up message 310 or the offset 340).

The method 1100 may further include activating a high power consuming device based on the start time of the discovery window, at 1103. For example, the mobile device 130 of FIG. 1 may activate a high power consuming device (e.g., a 2.4 GHz or a 5 GHz receiver or transceiver associated with a second wireless protocol) at the start time of the discovery window 250 (or at a time slightly prior to the start time to account for startup or processing delay).

The method 1100 may include, during the discovery window, performing at least one discovery operation associated with at least one device of the NAN, at 1104. For example, during the discovery window 250 of FIG. 3, the mobile device 130 may discover the NAN devices 120, discover services provided by the NAN devices 120, exchange data with the NAN devices 120, schedule a later data exchange, or perform other operations.

Figure 12:
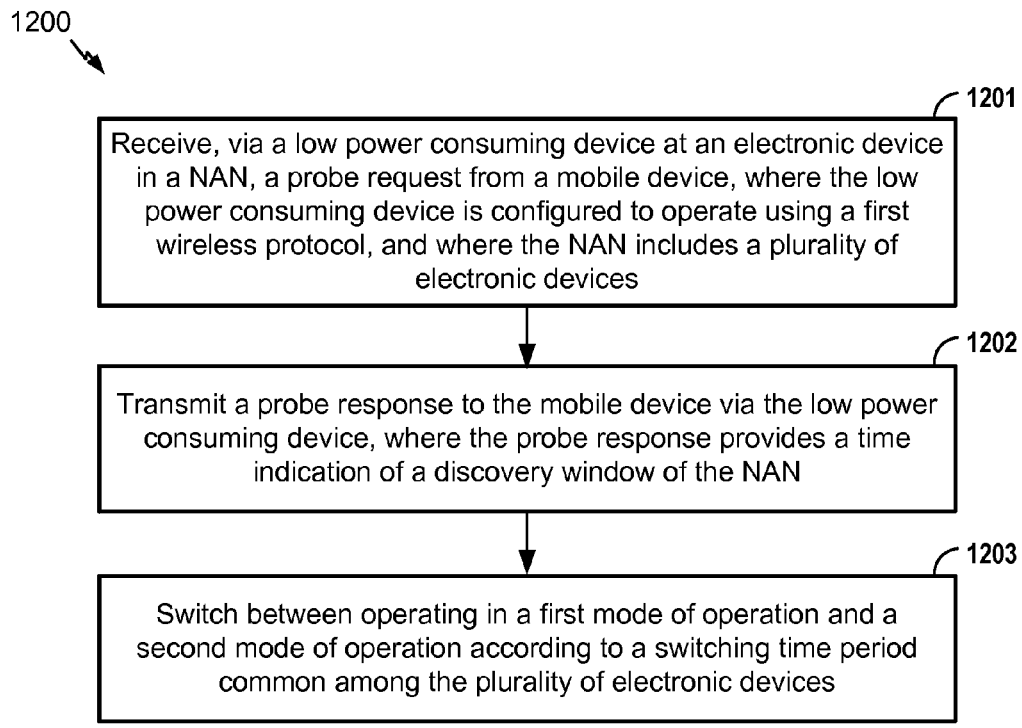
FIG. 12 is a flowchart to illustrate a fourth embodiment of a method of operation of a device of a NAN.

Referring to FIG. 12, a fourth embodiment of a method 1200 of operation at a device of a NAN is shown. The method 1200 may be performed using one of the NAN devices 120 of FIG. 5.

The method 1200 may include receiving, via a low power consuming device at an electronic device in a NAN, a probe request from a mobile device, at 1201. The low power consuming device is configured to operate using a first wireless protocol (e.g., an IEEE 802.11ah wireless protocol). The NAN may include a plurality of electronic devices. For example, in FIG. 5, the NAN device 120-3 may receive the probe request 501 from the mobile device 130 via the first wireless protocol.

The method 1200 may further include transmitting a probe response to the mobile device via a low power consuming device, at 1202. The probe response may provide a time indication of a discovery window of the NAN. For example, in FIG. 5, the NAN device 120-3 may transmit the probe response 502 to the mobile device 130 utilizing the low power consuming device that is configured to operate using a first wireless protocol (e.g., the IEEE 802.11ah wireless protocol). The probe response 502 may provide a time indication of a discovery window of the NAN, such as the discovery window 250 of FIG. 3.

The method 1200 may further include switching between operating in a first mode of operation and a second mode of operation according to a switching time period common among the plurality of electronic devices, at 1203. For example, in FIG. 5, NAN device 120-3 may switch between operating in a receive mode during which the NAN device 120-3 is able to detect, receive, and respond to probe requests and a power-save mode during which the NAN device 120-3 does not detect, receive, or respond to probe requests. Each of the NAN devices 120 of FIG. 5 may remain in the receive mode and in the power save mode for approximately the same amount of time (e.g., according to a common switching time period). Switching between the receive mode and the power save mode may be staggered so that at least a threshold number of NAN devices 120 are in the receive mode at any given time. In a particular embodiment, one or more of the NAN devices 120 of FIG. 5 may remain a part of the NAN 110 or may attempt to discover another NAN and to join the discovered NAN.

Figure 13:
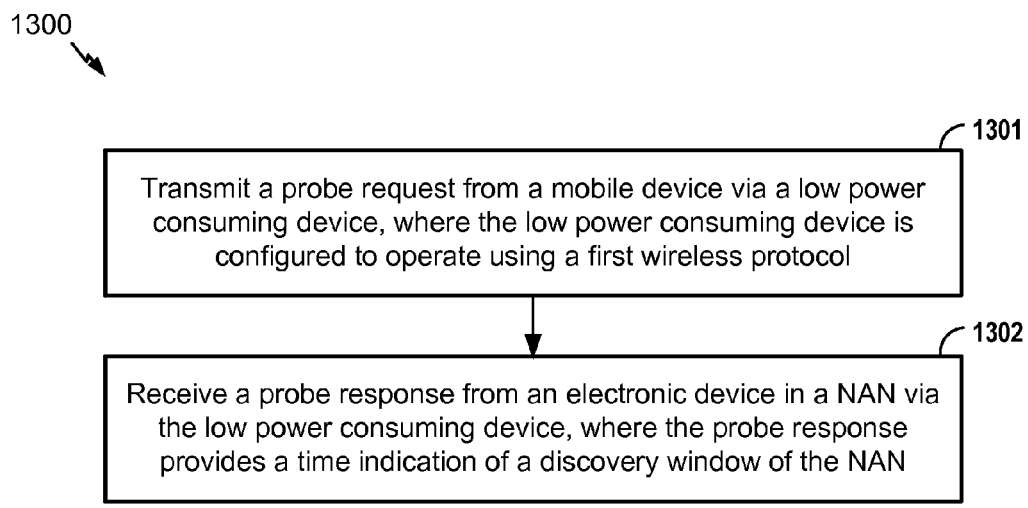
FIG. 13 is a flowchart to illustrate a fourth embodiment of a method of operation of a device entering a NAN.

Referring to FIG. 13, a fourth embodiment of a method 1300 of operation at a device entering a NAN is shown. The method 1300 may be performed using the mobile device 130 of FIG. 5.

The method 1300 may include transmitting a probe request from a mobile device via a low power consuming device, at 1301. The low power consuming device is configured to operate using a first wireless protocol (e.g., an IEEE 802.11ah wireless protocol). For example, in FIG. 5, the mobile device 130 may transmit the probe request 501 to the NAN device 120-3 utilizing a low power consuming device (e.g., receiver or transceiver associated with the first wireless protocol). In an alternate embodiment, the mobile device 130 may transmit the probe request 501 by the utilizing a high power consuming device (e.g., receiver or transceiver associated with the second wireless protocol).

The method 1300 may further include receiving a probe response from an electronic device in a NAN via the low power consuming device, at 1302. The probe response may provide a time indication of a discovery window of the NAN. For example, in FIG. 5, the NAN device 120-3 may transmit the probe response 502 to the mobile device 130 utilizing a low power consuming device that is configured to operate using a first wireless protocol (e.g., the IEEE 802.11ah wireless protocol). The probe response 502 may provide a time indication of a discovery window of the NAN, such as the discovery window 250 of FIG. 3.

Figure 14:
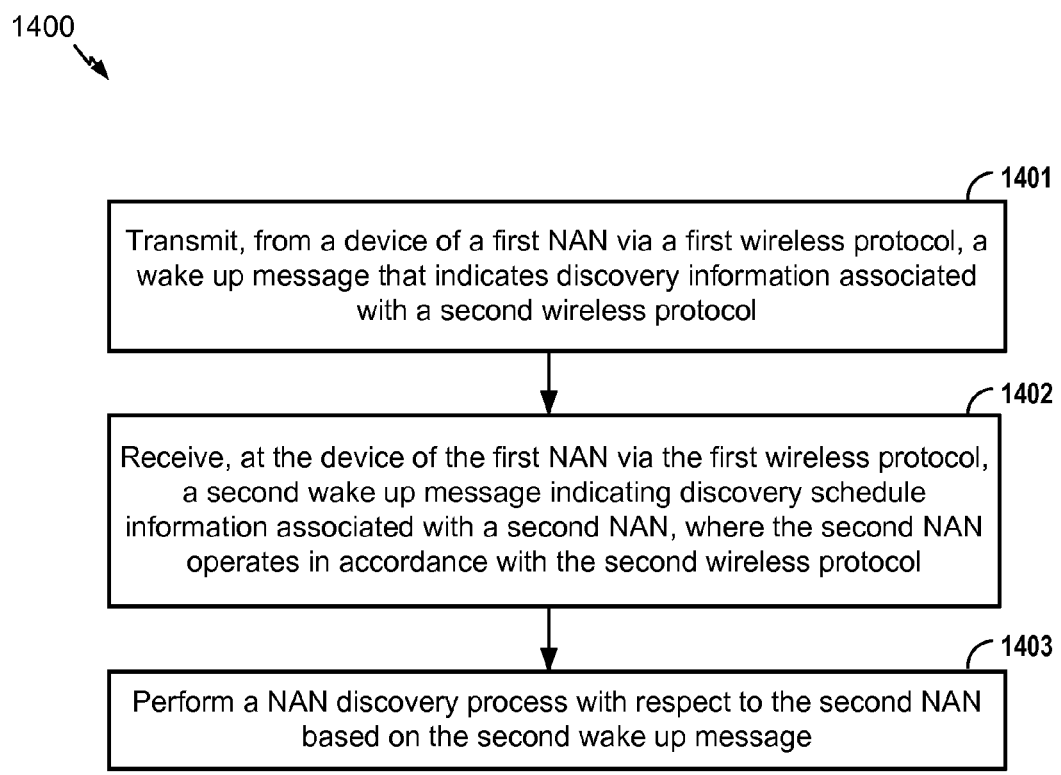
FIG. 14 is a flowchart to illustrate a fifth embodiment of a method of operation of a device of a NAN.

Referring to FIG. 14, a fifth embodiment of a method 1400 of operation at a device of a NAN is shown. The method 1400 may be performed using one of the NAN devices 120 of FIG. 1 or FIG. 5.

The method 1400 may include transmitting, from a device of a first NAN via a first wireless protocol, a wake up message that indicates discovery information associated with a second wireless protocol, at 1401. The wake up message may indicate a transmission time of a discovery beacon associated with the second wireless protocol. For example, in FIG. 1, the NAN device 120-3 of the NAN 110 (e.g., the first NAN) may transmit a wake up message (e.g., the message 140 of FIG. 1) to the mobile device 130 via a low power consuming device associated with a first wireless protocol (e.g., an IEEE 802.11ah protocol). The discovery information may be associated with a second wireless protocol (e.g., a wireless protocol associated with a 2.4 GHz frequency band or a 5 GHz frequency band) of the first NAN. In an illustrative embodiment, the wake up message is the wake up message 210 of FIG. 2, and the discovery beacon is the discovery beacon 230 of FIG. 2, and the wake up message 210 is transmitted at a particular time offset 240 prior to a start of the first discovery beacon 230.

The method 1400 may include receiving, at the device of the first NAN via the first wireless protocol, a second wake up message indicating discovery information associated with a second NAN, at 1402. The second NAN may operate in accordance with the second wireless protocol. For example, in FIG. 1, the NAN device 120-3 of the NAN 110 (e.g., the first NAN) may receive a second wake up message from a device of another NAN (e.g., a second NAN) via a low power consuming device associated with the first wireless protocol (e.g., the IEEE 802.11ah wireless protocol).

The method 1400 may further include performing a NAN discovery process with respect to the second NAN based on the second wake up message, at 1403. For example, in FIG. 1, the NAN device 120-3 may use the received second wake up message to determine a transmission time of a discovery beacon in the second NAN, a start time of a discovery window in the second NAN, or a combination thereof. The NAN device 120-3 may join the second NAN and perform the NAN discovery process with respect to the second NAN based on the second wake up message.

Figure 15:
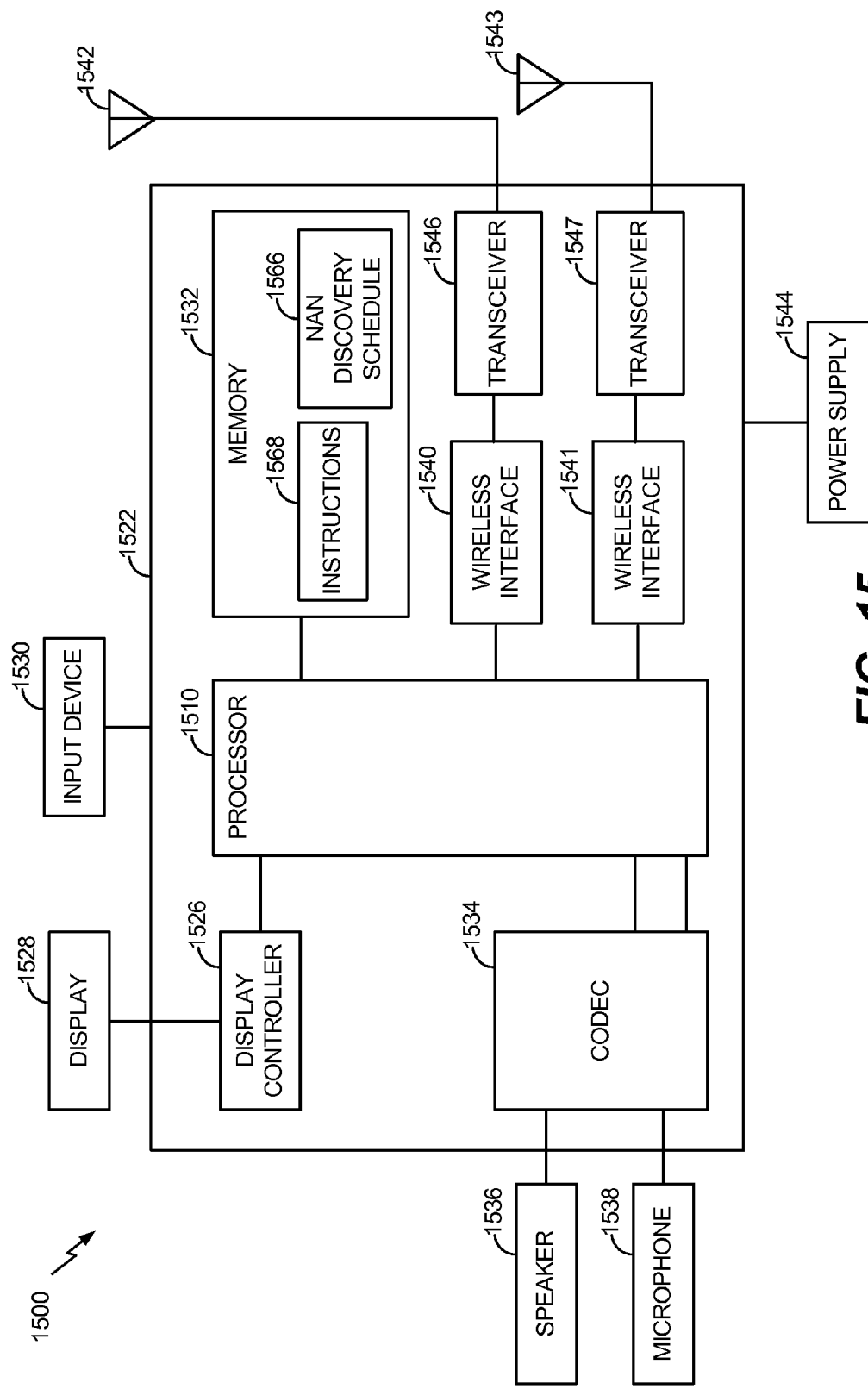
FIG. 15 is a diagram of a wireless device that is operable to support various embodiments of one or more methods, systems, apparatuses, or computer-readable media disclosed herein.

Referring to FIG. 15, a block diagram of a particular illustrative embodiment of a device is depicted and generally designated 1500. The device 1500 includes a processor 1510, such as a digital signal processor, coupled to a memory 1532. In an illustrative embodiment, the device 1500, or components thereof, may correspond to one or more of the NAN devices 120 of FIG. 1 or FIG. 5, the mobile device 130 of FIG. 1 or FIG. 5, the mobile device 150 of FIG. 1, or components thereof.

The processor 1510 (e.g., a digital signal processor (DSP), a central processing unit (CPU), a network processing unit (NPU), etc.) may be configured to execute software (e.g., a program of one or more instructions 1568) stored in the memory 1532. Additionally or alternatively, the processor 1510 may be configured to implement one or more instructions stored in a memory of a wireless interface 1540 (e.g., an interface that is configured to operate in compliance with an IEEE 802.11a, 802.11b, 802.11g, 802.11n, 802.11ac, or 802.11ad wireless protocol and/or that is configured to operate based on a 2.4 GHz frequency band or a 5 GHz frequency band) and a wireless interface 1541 (e.g., an interface that is configured to operate in compliance with an IEEE 802.11ah wireless protocol and/or that is configured to operate based on a sub-1 GHz frequency band or a 2.4 GHz frequency band). In a particular embodiment, the wireless interface 1541 may be an always-on interface and the wireless interface 1540 may be selectively activated and deactivated.

In a particular embodiment, the processor 1510 may execute the instructions 1568 to operate in accordance with one or more of the methods of FIGS. 6-11. The memory 1532 may also store NAN discovery schedule information 1566. For example, the NAN discovery schedule information 1566 may indicate times of upcoming discovery beacons or discovery windows. In an illustrative embodiment, the NAN discovery schedule information 1566 may be indicated by one or more messages (e.g., the information 190) received by the device 1500 via a first wireless protocol or via a second wireless protocol (e.g., the second wireless protocol described with reference to FIG. 1).

The wireless interface 1540 may be coupled to the processor 1510 and to an antenna 1542. For example, the wireless interface 1540 may be coupled to the antenna 1542 via a transceiver 1546 (e.g., a wireless transceiver that is compliant with an IEEE standard, such as 802.11a, 802.11b, 802.11g, 802.11n, 802.11ac, 802.11ad, etc.), such that data received via the antenna 1542 may be provided to the processor 1510. The wireless interface 1541 may be coupled to the processor 1510 and to an antenna 1543. For example, the wireless interface 1541 may be coupled to the antenna 1543 via a transceiver 1547 (e.g., a transceiver that is compliant with an IEEE standard, such as 802.11ah), such that data received via the antenna 1543 may be provided to the processor 1510. In an illustrative implementation, the device 1500 corresponds to the NAN device 120-3, the transceiver 1547 corresponds to the first transceiver 122, and the transceiver 1546 corresponds to the second transceiver 124 of FIG. 1. In another implementation, the device 1500 corresponds to the mobile device 130, the transceiver 1547 corresponds to the first transceiver 132, and the transceiver 1546 corresponds to the second transceiver 134 of FIG. 1.

A coder/decoder (CODEC) 1534 can also be coupled to the processor 1510. A speaker 1536 and a microphone 1538 can be coupled to the CODEC 1534. A display controller 1526 can be coupled to the processor 1510 and to a display device 1528. In a particular embodiment, the processor 1510, the display controller 1526, the memory 1532, the CODEC 1534, the wireless interface 1540, the transceiver 1546, the wireless interface 1541, and the transceiver 1547 are included in a system-in-package or system-on-chip device 1522. In a particular embodiment, an input device 1530 and a power supply 1544 are coupled to the system-on-chip device 1522. Moreover, in a particular embodiment, as illustrated in FIG. 15, the display device 1528, the input device 1530, the speaker 1536, the microphone 1538, the antenna 1542, the antenna 1543, and the power supply 1544 are external to the system-on-chip device 1522. However, each of the display device 1528, the input device 1530, the speaker 1536, the microphone 1538, the antenna 1542, the antenna 1543, and the power supply 1544 can be coupled to one or more components of the system-on-chip device 1522, such as one or more interfaces or controllers.

In conjunction with the described embodiments, an apparatus for communication includes a processor (e.g., the processor 1510) and a memory (e.g., the memory 1532) storing instructions (e.g., the instructions 1568) that are executable by the processor to cause the processor to initiate transmission, via a neighbor awareness network (NAN) (e.g., the NAN 110) using a first wireless protocol, of a wake up message indicating discovery information of the NAN. The instructions are further executable by the processor to communicate information (e.g., the information 190) via the NAN using the second wireless protocol after transmission of the wake up message.

The apparatus may further include a first transceiver (e.g., the first transceiver 122 or the transceiver 1547) associated with the first wireless protocol and a second transceiver (e.g., the second transceiver 124 or the transceiver 1546) associated with the second wireless protocol. The first transceiver may be configured to transmit the wake up message, and the second transceiver may be configured to communicate the information via the NAN.

In an illustrative implementation, the first transceiver is configured to operate using a sub-1 GHz frequency band, and the second transceiver is configured to operate using a 2.4 GHz frequency band. In another illustrative implementation, the first transceiver is configured to operate using a sub-1 GHz frequency band, and the second transceiver is configured to operate using a 5 GHz frequency band. In another illustrative implementation, the first transceiver is configured to operate using 2.4 GHz frequency band, and the second transceiver is configured to operate using a 5 GHz frequency band.

In conjunction with the described embodiments, a first apparatus for communication includes means for transmitting, from an electronic device in a neighbor awareness network (NAN) via a first wireless protocol, a wake up message indicating discovery information associated with a second wireless protocol. The discovery information may indicate a transmission time of a discovery beacon of the second wireless protocol, a discovery window of the second wireless protocol, or a time indication of the discovery window of the second wireless protocol, as illustrative examples. For example, the means for transmitting the wake up message may include the first transceiver 122, the wireless interface 1541 of FIG. 15, the transceiver 1547 of FIG. 15, the antenna 1543 of FIG. 15, one or more other devices, circuits, modules, or instructions to transmit a wake up message, or any combination thereof.

The first apparatus may also include means for communicating information via the NAN using the second wireless protocol after transmission of the wake up message. For example, the means for communicating may communicate information via the NAN 110 of FIG. 1. To illustrate, the means for communicating may include the second transceiver 124, the wireless interface 1540 of FIG. 15, the transceiver 1546 of FIG. 15, the antenna 1542 of FIG. 15, one or more other devices, circuits, modules, or instructions to transmit a synchronization beacon, or any combination thereof. The means for communicating may be configured to indicate a transmission time of a discovery beacon associated with the second wireless protocol in the discovery information.

A second apparatus for communication may include means for receiving, at a mobile device via a first wireless protocol, a wake up message indicating discovery information associated with a NAN that operates in accordance with a second wireless protocol. The discovery information may indicate a transmission time of a discovery beacon of the second wireless protocol, a discovery window of the second wireless protocol, or a time indication of the discovery window of the second wireless protocol. For example, the means for receiving may include the first transceiver 132, the wireless interface 1541 of FIG. 15, the transceiver 1547 of FIG. 15, the antenna 1543 of FIG. 15, one or more other devices, circuits, modules, or instructions to receive a wake up message, or any combination thereof.

The second apparatus may also include means for detecting a discovery beacon based on a transmission time indicated by the wake up message. For example, the means for detecting may include the second transceiver 134, the wireless interface 1540 of FIG. 15, the transceiver 1546 of FIG. 15, the antenna 1542 of FIG. 15, one or more other devices, circuits, modules, or instructions to detect a discovery beacon, or any combination thereof.

In conjunction with the described embodiments, a first non-transitory processor readable medium comprises instructions that, when executed by a processor, cause the processor to initiate transmission, from an electronic device in a neighbor awareness network (NAN) via a first wireless protocol, of a wake up message indicating discovery information of the NAN. The NAN operates in accordance with a second wireless protocol. The instructions may be further executable by the processor to indicate a transmission time of a discovery beacon of the second wireless protocol, a discovery window of the second wireless protocol, or a time indication of the discovery window of the second wireless protocol in the discovery information. For example, the processor 1510 of FIG. 15 may access the instructions 1568 of FIG. 15 stored at the memory 1532 of FIG. 15 and may execute the instructions 1568 to cause the processor 1510 to utilize the first transceiver 122 to transmit the wake up message. As another example, the processor 1510 may execute the instructions 1568 to utilize the wireless interface 1541 of FIG. 15, the transceiver 1547 of FIG. 15, and the antenna 1543 of FIG. 15 to transmit the wake up message.

The first non-transitory processor readable medium may further comprise instructions that, when executed by a processor, cause the processor to communicate information via the NAN using the second wireless protocol after transmission of the wake up message. For example, the processor may communicate information via the NAN 110 of FIG. 1. To illustrate, the processor 1510 of FIG. 15 may access the instructions 1568 of FIG. 15 stored at the memory 1532 of FIG. 15 and may execute the instructions 1568 to cause the processor 1510 to utilize the second transceiver 124 to communicate information via the NAN. As another illustration, the processor 1510 may execute the instructions 1568 to utilize the wireless interface 1540 of FIG. 15, the transceiver 1546 of FIG. 15, and the antenna 1542 of FIG. 15 to communicate information via the NAN.

A second non-transitory processor readable medium comprises instructions that, when executed by a processor, cause the processor to receive, at a mobile device via a first wireless protocol, a wake up message indicating discovery information associated with a neighbor awareness network (NAN) that operates in accordance with a second wireless protocol. The instructions may be further executable by the processor to cause the processor to indicate a transmission time of a discovery beacon of the second wireless protocol, a discovery window of the second wireless protocol, or a time indication of the discovery window of the second wireless protocol in the discovery information. For example, the processor 1510 of FIG. 15 may access the instructions 1568 of FIG. 15 stored at the memory 1532 of FIG. 15 and may execute the instructions 1568 to cause the processor 1510 to utilize the first transceiver 132 to receive the wake up message. As another example, the processor 1510 may execute the instructions 1568 to utilize the wireless interface 1541 of FIG. 15, the transceiver 1547 of FIG. 15, and the antenna 1543 of FIG. 15 to receive the wake up message.

Although one or more of FIGS. 1-15 may illustrate systems, apparatuses, or methods according to the teachings of the disclosure, the disclosure is not limited to these illustrated systems, apparatuses, or methods. One or more functions or components of any of FIGS. 1-15 as illustrated or described herein may be combined with one or more other portions of another of FIGS. 1-15. Further, the steps of one or more methods described with reference to any of FIGS. 1-15 may be removed, reordered, or performed at least partially concurrently. Accordingly, no single embodiment described herein should be construed as limiting and embodiments of the disclosure may be suitably combined without departing from the teachings of the disclosure.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of communication comprising:
   transmitting, from an electronic device within a coverage area of a neighbor awareness network (NAN), a wake up message in accordance with a first wireless protocol, the wake up message indicating discovery information associated with a second wireless protocol;
   after transmitting the wake up message, communicating information via the NAN in accordance with the second wireless protocol; and
   receiving, at the electronic device from another electronic device, a message indicating second discovery information associated with another NAN, the other NAN operating in accordance with the second wireless protocol.

2. The method of claim 1 further comprising: indicating a transmission time of a discovery beacon associated with the second wireless protocol in the discovery information.

3. The method of claim 2 further comprising: transmitting the discovery beacon in the communicating information via the NAN.

4. The method of claim 2, wherein the transmitting of the wake up message occurs prior to transmission of the discovery beacon.

5. The method of claim 1, wherein the discovery information indicates a discovery window associated with the second wireless protocol.

6. The method of claim 5, wherein the discovery window has a duration of 16 milliseconds (ms).

7. The method of claim 5, wherein the transmitting of the wake up message occurs prior to a start of the discovery window.

8. The method of claim 5, wherein the communicating information via the NAN includes communication during the discovery window.

9. The method of claim 1, wherein the communicating information via the NAN includes transmitting a synchronization beacon.

10. The method of claim 1, wherein the first wireless protocol comprises an Institute of Electrical and Electronics Engineers (IEEE) 802.11ah wireless protocol.

11. The method of claim 1, wherein the message is received from the other electronic device in accordance with the first wireless protocol.

12. The method of claim 1, wherein the message includes a time indication of a discovery window of the other NAN.

13. The method of claim 1, wherein the first wireless protocol is associated with a sub-1 gigahertz (GHz) frequency band and the second wireless protocol is associated with a 2.4 GHz frequency band.

14. The method of claim 1, wherein the first wireless protocol is associated with a sub-1 gigahertz (GHz) frequency band and the second wireless protocol is associated with a 5 GHz frequency band.

15. The method of claim 1, wherein the first wireless protocol is associated with a 2.4 gigahertz (GHz) frequency band and the second wireless protocol is associated with a 5 GHz frequency band.

16. An apparatus for communication comprising:
a processor; and
a memory storing instructions that are executable by the processor to cause the processor to:
initiate transmission, via a neighbor awareness network (NAN), of a wake up message in accordance with a first wireless protocol, the wake up message indicating discovery information of the NAN, and the NAN operating in accordance with a second wireless protocol;
after transmission of the wake up message, communicate information via the NAN in accordance with the second wireless protocol; and
receive, from another electronic device, a message indicating second discovery information associated with another NAN, the other NAN operating in accordance with the second wireless protocol.

17. The apparatus of claim 16, further comprising a first transceiver associated with the first wireless protocol.

18. The apparatus of claim 17, the first transceiver configured to transmit the wake up message.

19. The apparatus of claim 17, further comprising a second transceiver associated with the second wireless protocol.

20. The apparatus of claim 19, the second transceiver configured to communicate the information via the NAN.

21. The apparatus of claim 19, the first transceiver configured to operate using a sub-1 gigahertz (GHz) frequency band and the second transceiver configured to operate using a 2.4 GHz frequency band.

22. The apparatus of claim 19, the first transceiver configured to operate using a sub-1 gigahertz (GHz) frequency band and the second transceiver configured to operate using a 5 GHz frequency band.

23. The apparatus of claim 19, the first transceiver configured to operate using 2.4 gigahertz (GHz) frequency band and the second transceiver configured to operate using a 5 GHz frequency band.

24. An apparatus for communication comprising:
means for transmitting, from an electronic device within a coverage area of a neighbor awareness network (NAN), a wake up message in accordance with a first wireless protocol, the wake up message indicating discovery information associated with a second wireless protocol;
means for communicating information via the NAN in accordance with the second wireless protocol after transmission of the wake up message; and
means for receiving a message, from another electronic device, indicating second discovery information associated with another NAN, the other NAN operating in accordance with the second wireless protocol.

25. The apparatus of claim 24, wherein the means for transmitting includes a first transceiver associated with the first wireless protocol and the means for communicating includes a second transceiver associated with the second wireless protocol.

26. The apparatus of claim 24, wherein the means for communicating is configured to indicate a transmission time of a discovery beacon associated with the second wireless protocol in the discovery information.

27. A non-transitory processor readable medium comprising instructions that, when executed by a processor, cause the processor to:
initiate transmission, from an electronic device within a neighbor awareness network (NAN), of a wake up message in accordance with a first wireless protocol, the wake up message indicating discovery information of the NAN, and the NAN operating in accordance with a second wireless protocol;
after transmission of the wake up message, communicate information via the NAN in accordance with the second wireless protocol; and
receive, at the electronic device from another electronic device, a message indicating second discovery information associated with another NAN, the other NAN operating in accordance with the second wireless protocol.

28. The non-transitory processor readable medium of claim 27, the instructions further executable by the processor to cause the processor to: indicate a transmission time of a discovery beacon associated with the second wireless protocol in the discovery information.

29. The non-transitory processor readable medium of claim 27, the instructions further executable by the processor to cause the processor to: indicate a discovery window associated with the second wireless protocol in the discovery information.

* * * * *